US008477109B1

(12) United States Patent
Freed

(10) Patent No.: US 8,477,109 B1
(45) Date of Patent: Jul. 2, 2013

(54) SURFACING REFERENCE WORK ENTRIES ON TOUCH-SENSITIVE DISPLAYS

(75) Inventor: Ian W. Freed, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 420 days.

(21) Appl. No.: 12/823,077

(22) Filed: Jun. 24, 2010

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| | | | |
|---|---|---|---|
| 5,416,896 A | | 5/1995 | Motoyama |
| 5,483,629 A | | 1/1996 | Motoyama et al. |
| 5,745,776 A | | 4/1998 | Sheppard, II |
| 2003/0160830 A1 | * | 8/2003 | DeGross ........................ 345/808 |
| 2004/0248653 A1 | * | 12/2004 | Barros et al. ..................... 463/43 |
| 2007/0011160 A1 | | 1/2007 | Ferland et al. |
| 2007/0136231 A1 | | 6/2007 | Padmanabhan |
| 2007/0265834 A1 | | 11/2007 | Melnick |
| 2010/0005087 A1 | | 1/2010 | Basco et al. |
| 2010/0128994 A1 | | 5/2010 | Zwolinski |
| 2010/0153440 A1 | | 6/2010 | Hubert |
| 2011/0018695 A1 | * | 1/2011 | Bells et al. ................. 340/407.2 |
| 2011/0161073 A1 | | 6/2011 | Lesher et al. |

OTHER PUBLICATIONS

Haupt, "Fun and Functional. Interesting new consumer-technology products", Horizon Air Magazine, Mar. 2010, 8 pages.
"Babylon 8 Translation Softwar and Dictionary Tool" retrieved on May 7, 2010 at <<http://www.babylon.com/>>, entire website, Babylon, 2 pages.
Office action for U.S. Appl. No. 12/749,073, mailed on Jan. 20, 2012, Rachabathuni et al., "Context-Sensitive Reference Works", 25 pages.
Office action for U.S. Appl. No. 12/749,073, mailed on Jul. 5, 2012, Rachabathuni et al., "Context-Sensitive Reference Works", 22 pages.

* cited by examiner

*Primary Examiner* — Joseph Haley
(74) *Attorney, Agent, or Firm* — Lee & Hayes, PLLC

(57) ABSTRACT

Techniques for outputting different reference work entries based on an amount of force applied to a touch-sensitive display of a device. For instance, when a user reads an electronic book (eBook) on a device having a touch-sensitive display, the user may make a selection of a word or phrase within the eBook by touching the display at a location of the word or phrase. The techniques may then determine which of multiple different reference work entries to output based on a measured amount of force of the selection. For instance, the device may output a dictionary definition of the selected word in response to measuring a first amount of force, while outputting a thesaurus entry for the word in response to measuring a second, greater amount of force.

30 Claims, 20 Drawing Sheets

SURFACING REFERENCE WORK ENTRIES ON TOUCH-SENSITIVE DISPLAYS

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an architecture in which a community of users operates respective client devices to consume content items, such electronic books (eBooks), songs, videos and the like. In this architecture, the client devices and/or a content item service implement techniques to provide context-sensitive reference works (e.g., dictionaries, thesauruses, atlases, etc.) that provide requested information to the users based on a genre of the content item associated with the request, a characteristic of the user, or the like.

DETAILED DESCRIPTION

Figure 1:
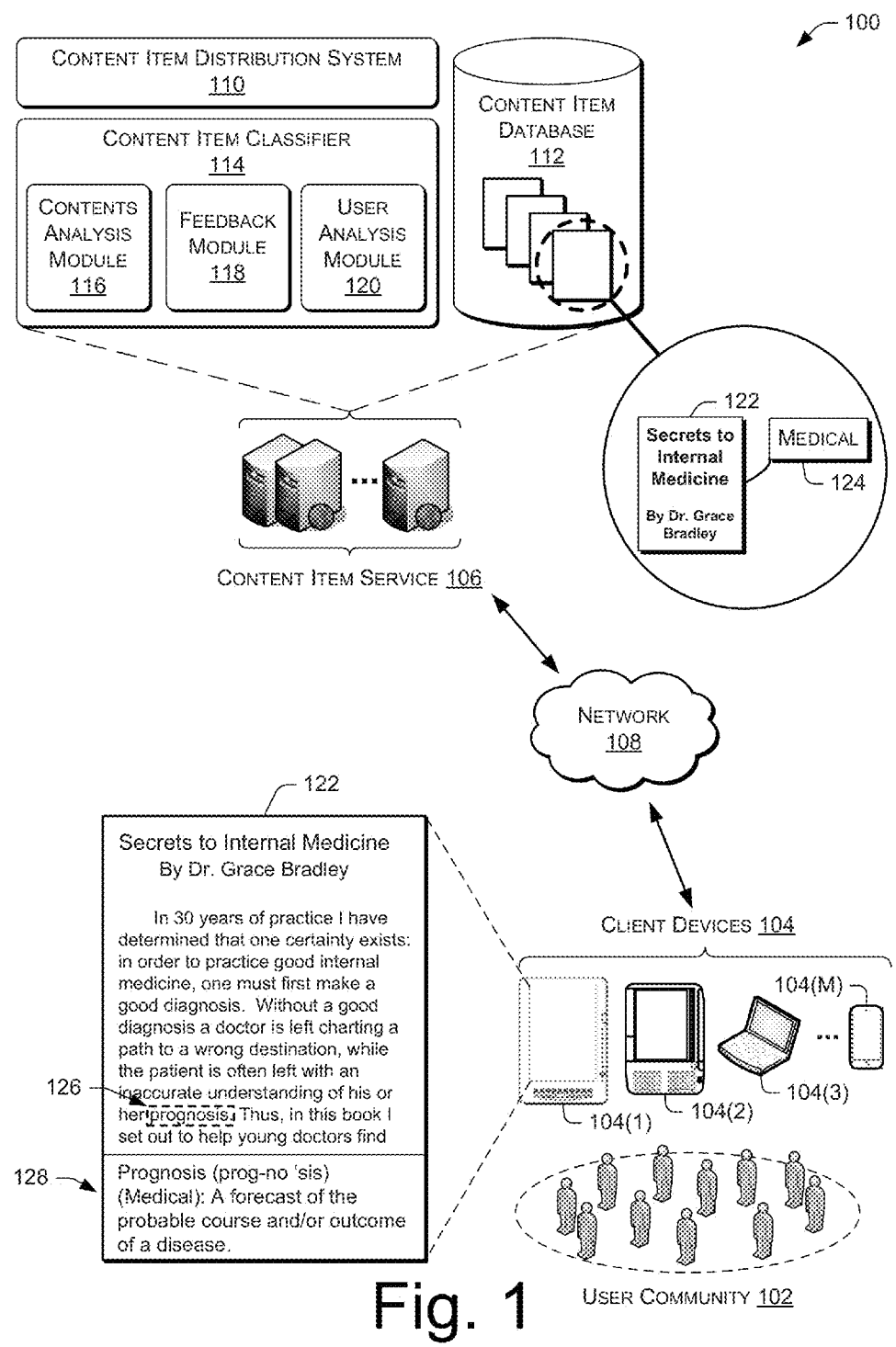

This disclosure describes techniques for outputting different reference work entries based on an amount of force applied to a touch-sensitive display of a device. For instance, when a user reads an electronic book (eBook) on a device having a touch-sensitive display, the user may make a selection of a word or phrase within the eBook by touching the display at a location of the word or phrase. The techniques may then determine which of multiple different reference work entries to output based on a measured amount of force of the selection. For instance, the device may output a dictionary definition of the selected word in response to measuring a first amount of force. Additionally or alternatively, the device may output a thesaurus entry for the word in response to measuring a second, greater amount of force.

This disclosure also describes an architecture and techniques for outputting requested information from reference works (e.g., dictionaries, thesauruses, almanacs, atlases, encyclopedias, gazetteers) in a context-sensitive manner. For instance, when a user reads an electronic book (eBook) and requests a definition for a word found within the eBook, the techniques may display a definition for the word that has been selected based on the context of the request. In one example, the techniques may display a definition that corresponds to one or more identified genres of the eBook in which the word appears. In another example, the techniques may display a definition that corresponds to known information about the user, such as a preference of the user or the like.

For instance, if a user currently reading a medical-related eBook requests to receive a definition of a word from the eBook, the techniques will display a medical-related definition of the word. If the user reads a science-fiction (sci-fi) eBook, meanwhile, the techniques may display a sci-fi or science-related definition of the word. In each of these instances, the techniques may display more than one definition, with the order of the displayed definitions being based on the classification of the eBook. For instance, the medical definition may be displayed first in instances where the eBook is determined be medical-related. As such, the techniques display information from a reference work, such as the dictionary, in a manner that is more likely to be relevant and of interest to the user.

While the discussion below describes these techniques in the context of eBooks rendered on eBook reader devices, these techniques may apply to a variety of different types of content items, such as songs, videos, still images, and so on. Furthermore, the techniques may apply to a variety of different electronic devices, such as personal computers, cellular telephones, personal digital assistants (PDAs), portable media players, tablet computers, netbooks, and the like.

In each instance, the techniques may classify a particular content item as being associated with one or more particular genres (e.g., science, science fiction, medicine, business, law, fiction, a particular foreign language, etc.). Before or after the classification, a user experiencing the content item may request some information regarding the content item that may be found within a reference work. For instance, the user may request a definition of a word, synonyms or antonyms for a word, information from an encyclopedia regarding an identified word, phrase, or topic, a map for or directions to an identified location, or the like. In response to receiving this request, the techniques select an entry from the appropriate type of reference work and then output (e.g., visually, audibly, etc.) the reference work entry.

For instance, if a user requests information about a particular topic from within the content item, the techniques may select the corresponding encyclopedia entry based on the genre of the content item. For instance, if the user currently experiences a sports-themed content item and the user requests information regarding the topic "bat," the techniques may output information regarding "bats" from a sports-themed encyclopedia. This information will likely discuss a round, elongated object for hitting a ball. If, however, the user currently experiences an animal-related content item and the user makes the same request, the techniques may output an encyclopedia entry from an animal-related encyclopedia. This information will likely discuss the nocturnal mammal.

While the above example describes referencing discrete reference works (here, encyclopedias), the techniques may instead reference a single reference work that includes multiple different types of entries (e.g., sports-related, animal-related, medical, etc.). For instance, a single encyclopedia may include an entry for "bat" in the sports sense and an entry for "bat" in the animal sense. Here, the techniques may display one or both of the definitions in a manner based on the identified genre of the content item.

The discussion begins with a section, entitled "Context-Sensitive Reference Works," that includes numerous sub-sections. A first sub-section is entitled "Example Architecture" and describes one example architecture and several example components that implement the techniques introduced above. Next, a sub-section entitled "Example eBook Reader Device" follows, and describes example components of one type of device that may implement context-sensitive reference works. A sub-section entitled "Example User Interfaces" follows, describing examples of user interfaces (UIs) that may be served to and rendered at the client devices of FIG. 1. The discussion then moves on to illustrate and describe an "Example Process" for implementing the described techniques.

The discussion also includes a second section, entitled "Surfacing Reference Work Entries on Touch-Sensitive Displays," that also includes numerous sub-sections. A first sub-section is entitled "Example eBook Reader Device" and describes example components of one type of device that may implement the techniques in this section. A sub-section entitled "Example User Interfaces and Processes" follows before the discussion ends with a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Context-Sensitive Reference Works

Architectural Environment

FIG. 1 illustrates an example architecture 100 in which a community of users 102 operates respective client devices 104(1), 104(2), 104(3), . . . , 104(M) to consume content items, such electronic books (eBooks), songs, videos, still images and the like. In this architecture, the client devices 104 and/or a content item service 106 implement techniques to provide context-sensitive reference works (e.g., dictionaries, thesauruses, atlases, etc.) that provide requested information to the users based on a genre of the content item associated with the request, a characteristic of the requesting user, or the like.

The client devices 104 are variously configured with different functionality to enable consumption of one or more types of contents items of any type or format including, for example, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), and multi-media content. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

FIG. 1 illustrates that the client devices 104 operated by users of the user community 102 may comprises eBook reader devices (e.g., devices 104(1) and 104(2)), laptop computers (e.g., device 104(3)), multifunction communication devices (e.g., device 104(M)), portable digital assistants (PDAs), wireless headsets, entertainment systems, portable media players, tablet computers, cameras, video cameras, netbooks, notebooks, desktop computers, gaming consoles, DVD players, media centers, or any other type of device.

In the architecture 100, the client devices may receive, over a network 108, one or more content items for presentation on the devices from the content item service 106. The network 108 is representative of any one or combination of multiple different types of networks, such as the Internet, cable networks, cellular networks, wireless networks, and wired networks. One example of a wireless technology and associated protocols is the Wireless Fidelity (WiFi) wireless networking technologies defined according to IEEE 802.11 standards, while another example is a cellular network.

As illustrated, the content item service 106 is embodied as one or more servers that collectively have processing and storage capabilities to receive requests for content items from the devices, such as the eBook reader device 104(1). The servers of the content item service 106 may be embodied in any number of ways, including as a single server, a cluster of servers, a server farm or data center, and so forth, although other server architectures (e.g., mainframe) may also be used. Alternatively, the content item service 106 may be embodied as a client device, such as desktop computer, a laptop computer, an eBook reader device and so forth. In some implementations, for instance, some or all of the elements of content item service 106 illustrated in FIG. 1 may reside on the client devices 104.

In the illustrated example, the content item service 106 includes a content item distribution system 110, a content item database 112, and a content item classifier 114. The content item distribution system 110 may support distribution of content items (e.g., online retailing via a website) to the client devices 104. In some implementations, the servers store the content items in the content item database 112, although in other implementations, the servers merely facilitate purchase and delivery of content items stored in other locations.

The content item classifier 114, meanwhile, serves to classify content items by, for example, genre. For instance, the classifier 114 may classify content items as relating to fiction, non-fiction, historical, science, science fiction, medicine, business, law, sports, animals, geography, computer science, engineering, chemistry, mathematics, a particular language or any other type of genre, category, or classification. To classify these content items, the classifier 114 may reference a prior categorization of the content items within, for example, the content item database 112. Or, the classifier may classify these content items in other ways, as discussed in detail below.

Furthermore, the content item classifier 114 may classify content items as relating to multiple different genres. For instance, an eBook that includes multiple sections may be associated with different genres corresponding to the different sections of the book. A textbook, for instance, may include a section classified as relating to mathematics, a section classified as relating to science, and a section classified as relating to medicine. A single section or an entire eBook may also be classified as relating to multiple genres.

As discussed in detail below, these genre classifications may be used to determine which category of reference work entry to use when receiving a request for information from a user. For instance, if a user reading the afore-mentioned textbook requests a definition for a word found within the science section of the book, the device of the user may display a science-related dictionary entry (alone or more prominently than other definitions).

The content item classifier 114 may classify content items in a multitude of ways. As illustrated, the content item classifier 114 includes a contents analysis module 116, a feedback module 118, and a user analysis module 120. The contents analysis module 116 may classify content items with reference to the actual contents of the item. Using an eBook as an example, this module 116 may scan the text of the eBook to identify key words and may then compare these identified key words to known, pre-compiled sets of key words associated with different genres. For example, the module 116 may scan contents of an eBook and may identify that the most-frequently used words of the eBook include "medicine," "doctor," "Dr.," "disease," and "hospital." As such, the module 116 may compare these key words to sets of key words associated with different genres before concluding that this book should be classified as being within the medical genre. Similarly, the module 116 may analyze images or sounds within a content item and may compare these images or sounds to known sets of images or sounds associated with identified genres.

In some instances, this module 116 may weight certain words more heavily than others. For instance, the module 116 may weight the words of the title more heavily than the words within the chapters of the book. Similarly, the module 116 may assign a larger weight to the name of the author, the identity of the publisher, and the like.

The feedback module 118, meanwhile, serves to classify content items in whole or in part based upon received feedback. For instance, these techniques may include querying human users as to the genre of a content item and using responses from the users as input in determining the genre(s) of the respective content item. Furthermore, this module 118 may also track user actions in order to receive this feedback. For instance, envision that a user requests a definition found within a particular eBook for the term "boil." Envision also that the classifier 114 has classified this eBook as relating to science and, as such, the user's device displays a science definition of the term boil, explaining that "boiling" refers to when a liquid changes state to a gas. However, feedback module 118 may determine (e.g., via an indication received over the network 108) that the user requested to see a different definition of the term "boil" (e.g., a medical definition). In this instance, the feedback module 118 may deduce that the eBook should have been classified as being of the "medical" genre rather than the "science" genre.

In some instances, the classifier 114 may assign a confidence level to a particular genre associated with a content item and may alter this genre based on feedback received at the feedback module 118. For instance, the classifier may determine that the eBook from this example above is 53% likely to be primarily of a "science" genre and 47% likely to be primarily of a "medical" genre. After receiving feedback similar to the feedback from the user discussed immediately above, these percentages may change such that the classifier 114 now judges that the eBook is more likely to relate to medicine than pure science. As such, the classifier 114 may change the assigned genre to "genre" (or may change the primary genre to "medical" while marking "science" as a secondary genre).

The user analysis module 120, meanwhile, may function to classify content items in whole or in part based upon the identity of the user experiencing the media item. For instance, when the content item distribution system 110 downloads an eBook to the eBook reader device 104(1), the module 120 may analyze known information about the user associated with the device by, for instance, referencing a user profile stored in an account of the user at the content item service 106. The module 120 may then use this known information about the user to help deduce the genre of the eBook.

For instance, envision that the user associated with the eBook reader device 104(1) often purchases eBooks, audio items, and the like that are classified as being of the "medical" genre. Therefore, when attempting to determine the genre of a new eBook purchased at the device 104(1), the module 120 may more heavily weight the chances of this eBook being related to medicine. The user analysis module 120 may similarly use any other known information about the user to help classify content items, including a location of the user, demographic information of the user, an address of the user, and the like.

With information from some or all of the modules 116, 118, and 120, the content item classifier 114 may classify content items as belonging to one or more genres. For instance, individual sections of content items (e.g., chapters, individual songs or tracks, etc.) may each be associated with one or more genres, or an entire content item may be associated with a single or multiple genres. In each instance, the determined genre(s) is helpful to determine the appropriate type or category of reference work entry to use when a user requests information regarding a word, phrase, or topic within the corresponding content item.

FIG. 1, for instance, illustrates that the eBook reader device 104(1) currently displays a fictitious eBook 122 entitled "Secrets to Internal Medicine" by a fictitious author "Dr. Grace Bradley," which the device 104(1) may have downloaded from the content item service 106. FIG. 1 also illustrates that the content item database 112 stores the same eBook 122. In addition, FIG. 1 illustrates that the content item classifier 114 has classified this eBook 122 as relating a particular genre 124. Here, the classifier 114 has determined that the eBook relates to medicine and has classified this book accordingly. The content item database 112 may similarly store multiple other content items along with a notation of the genre(s) of each of these other items.

In this example, the user of the eBook reader device 104(1) has selected (via a highlight 126) a particular word ("prognosis") from the eBook 122. In response, the eBook reader device 104(1) displays a definition 128 of the selected word. Here, the definition 128 of the word comes from a medical dictionary entry, which corresponds to the classification of the eBook 16 as being related to the "medical" genre. As such, this definition 128 states that a "prognosis" is "a forecast of the probable course and/or outcome of a disease." While this example describes a dictionary, other implementations may employ other types or categories of reference works, a few examples of which are discussed below.

Example eBook Reader Device

Figure 2:
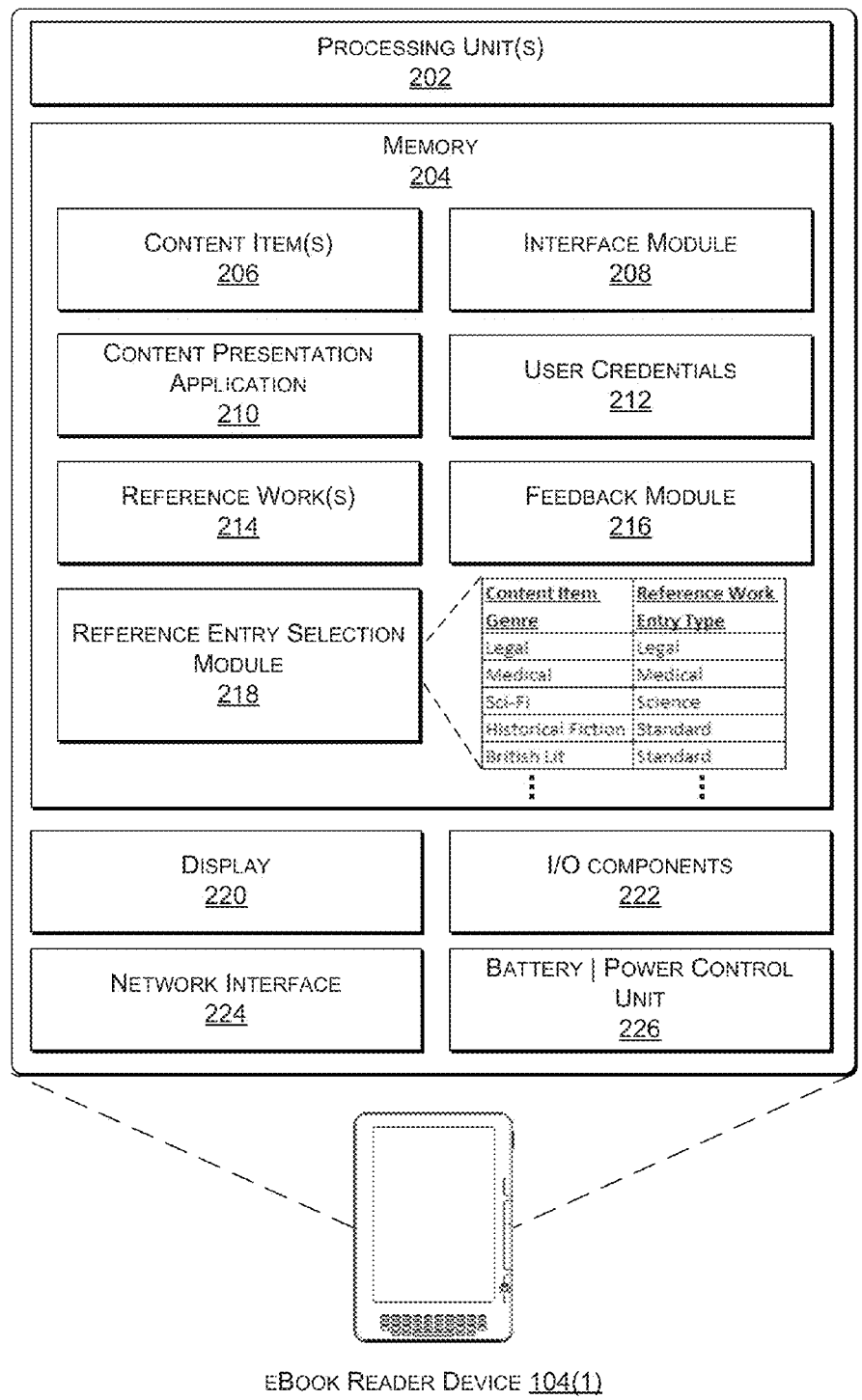
FIG. 2 is a block diagram of selected modules of an eBook reader device capable of receiving a request for information from a user experiencing a content item, determining a type of reference work entry appropriate for the content item or the user, and providing the information to the user from the determined type of reference work entry.

FIG. 2 illustrates example components that might be implemented in the eBook reader device 104(1) of FIG. 1 that displays information provided by context-sensitive reference works, such as dictionaries or the like. In this example, the eBook reader device 104(1) is a dedicated, handheld eBook reader device, although other electronic devices may implement these techniques and, hence, may include some of the functionality described herein.

In a very basic configuration, the eBook reader device 104(1) includes one or more processing units 202 and memory 204. Depending on the configuration of a dedicated eBook reader device 104(1), the memory 204 (and other memories described throughout this document) is an example of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the eBook reader device 104(1).

The memory 204 may be used to store any number of functional components that are executable on the processing unit(s) 202, as well as data and content items that are rendered by the eBook reader device 104(1). Thus, the memory 204 may store an operating system and an eBook storage database to store one or more content items 206, such as eBooks, audio books, songs, videos, still images, and the like. The memory 204 may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the eBook reader device 104(1). Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

An interface module 208 may also be provided in memory 204 and may be executed on the processing unit(s) 202 to provide for user operation of the device 104(1). One feature of the interface module 208 allows a user to request to receive information from a reference work regarding a word, phrase, or topic found within one of the content items 206. For instance, the interface module 208 may allow the user to request a definition of a word from a dictionary, synonyms from a thesaurus, a map from an atlas, and the like.

The interface module 208 may facilitate textual entry of request (e.g., via a cursor, controller, keyboard, etc.), audible entry of the request (e.g., via a microphone), or entry of the request in any other manner. The interface module 208 may provide menus and other navigational tools to facilitate selection and rendering of the content items 206. The interface module 208 may further include a browser or other application that facilitates access to sites over a network, such as websites or online merchants.

A content presentation application 210 renders the content items 206. The content presentation application 210 may be implemented as various applications depending upon the content items. For instance, the application 210 may be an electronic book reader application for rending electronic books, or an audio player for playing audio books or songs, or a video player for playing video, and so forth.

The memory 204 may also store user credentials 212. The credentials 212 may be device specific (set during manufacturing) or provided as part of a registration process for a service. The credentials may be used to ensure compliance with DRM aspects of rendering the content items 206.

The memory 204 also stores one or more reference works 214, such as one or more dictionaries, thesauruses, encyclopedias, atlases, gazetteers, and the like. In some instances, the memory 204 stores multiple categories of a particular kind of reference work. For instance, the memory 204 may store a standard dictionary (e.g., Merriam-Webster® English Dictionary), a medical dictionary, a legal dictionary, a science dictionary, a science-fiction dictionary, an engineering dictionary, a foreign language dictionary, a business dictionary, a chemistry dictionary, a mathematics dictionary, and the like. In other instances, a single kind of reference work may contain multiple reference work entry types. For instance, a single dictionary may store, for one or more of the words therein, a standard dictionary entry, a medical dictionary entry, a legal dictionary entry, a science dictionary entry, and the like.

FIG. 2 further illustrates that the memory 204 stores a feedback module 216 that is executable on the processing unit(s) to receive user feedback regarding an outputted reference work entry or a classified genre of a content item. As discussed above, this feedback may be used to help re-classify the genre associated with the content item.

The eBook reader device 104(1) also stores a reference entry selection module 218 that is executable on the processing unit(s) to select a particular type of reference work entry based on a genre of a content item, a characteristic of a user, or the like. For instance, this module 218 may store or reference a table that maps "content item genres" to "reference work entry types." Therefore, when the content presentation application 210 outputs a content item of a particular genre and the user requests some reference work information associated with a word, phrase, or topic therein, the module 218 may reference this table to determine the type of entry to output. In some instances, the reference entry selection module 218 may reside on the content item service 106 or in another location, in which case the eBook reader device 104(1) may access the module 218 over the network 108.

In the example of FIG. 1, the module 218 may determine that the application 210 should display a medical definition when receiving a request for a word within an eBook that has been categorized as "medical" in nature. This table may similarly map a "legal" genre to a "legal" reference work entry type, a "sci-fi" genre to a "science" reference work entry type, a "historical fiction," "British lit" and the like to a "standard" reference work entry type, and so on. In some instances, this table may map combinations of genres to reference work entry types. For instance, the table may map an eBook that is associated with both a "medical" genre and a "mystery" genre to a "standard" reference work entry type rather than a "medical" reference work entry type. It is to be appreciated, however, that FIG. 2 simply illustrates several example mappings, and that any type of content item genre may map to any type of reference work entry type in certain implementations.

FIG. 2 further illustrates that the eBook reader device 104(1) may include a display 220, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 104(1) may further be equipped with various input/output (I/O) components 222. Such components may include various user interface controls (e.g., buttons, a joystick, a keyboard, etc.), audio speakers, connection ports, and so forth.

A network interface 224 supports both wired and wireless connection to various networks, such as cellular networks, radio, WiFi networks, short range networks (e.g., Bluetooth), IR, and so forth. The network interface 224 may allow a user of the device 104(1) to download content items from the content item service 106, may allow the feedback module 216 to provide received feedback to the service 106, and the like.

The eBook reader device 104(1) also includes a battery and power control unit 226. The battery and power control unit operatively controls an amount of power, or electrical energy, consumed by the eBook reader device. Actively controlling the amount of power consumed by the reader device may achieve more efficient use of electrical energy stored by the battery.

The eBook reader device 104(1) may have additional features or functionality. For example, the eBook reader device 104(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example User Interfaces

FIGS. 3-6 illustrate example user interfaces that the eBook reader device 104(1) (and the other client devices of the architecture 100) may render in accordance with the techniques described above. While these figures illustrates a few example interfaces it is to be appreciated that numerous other types of interfaces displaying information from numerous other types of reference works may be implemented using the described techniques.

Figure 3:
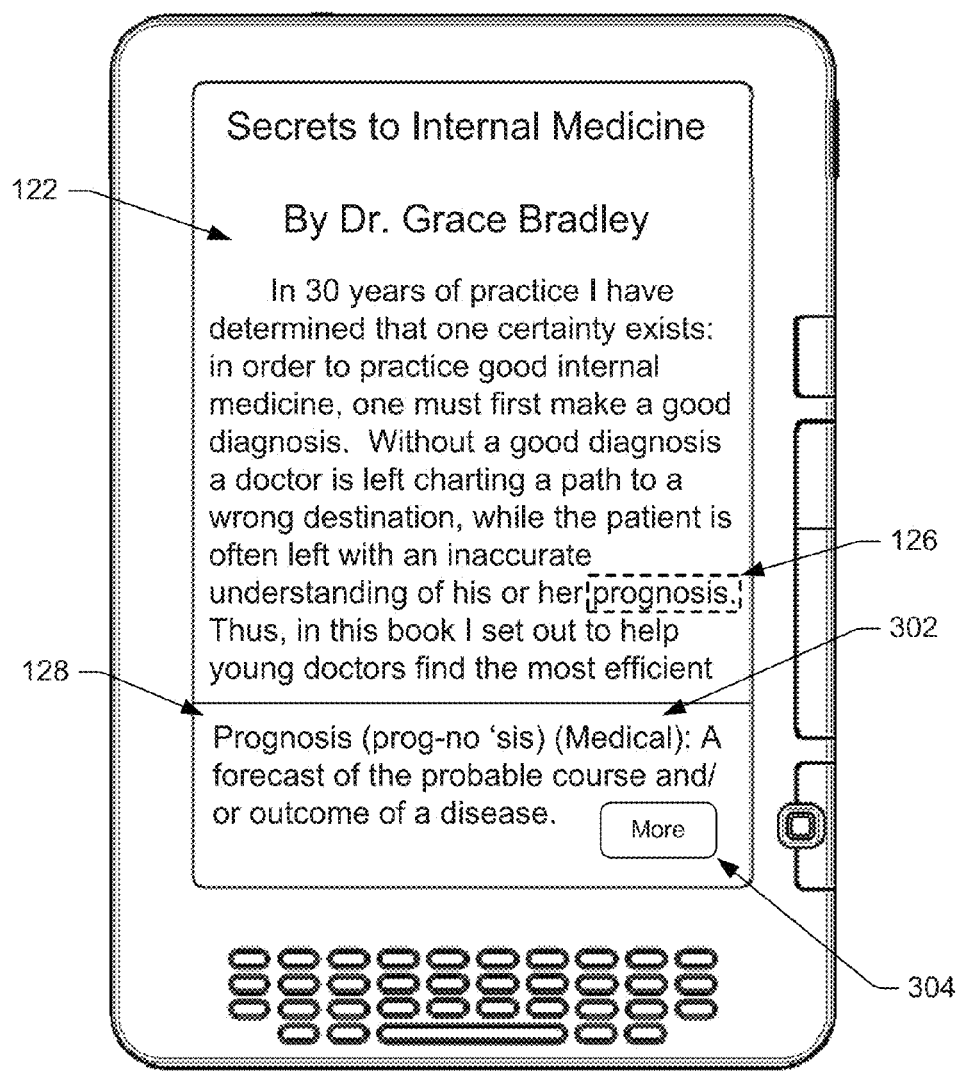
FIG. 3 illustrates an example user interface rendered by the devices of FIGS. 1 and 2. Here, the device or the content item service has determined that the eBook currently being read by the user is associated with a "medical" genre. As such, when the user requests a definition for a word within the eBook, the device displays a "medical" definition of the word rather than a standard or other type of definition.

FIG. 3 illustrates the example user interface described above with reference to FIG. 1. Here, the eBook reader device 104(1) or the content item service 106 has determined that the eBook 122 currently being read by the user is associated with a "medical" genre. As such, when the user requests a definition for a word within the eBook, the device displays a "medical" definition of the word rather than a standard or other type of definition.

Specifically, FIG. 3 illustrates that the user has selected (e.g., via a keyboard, cursor, touch screen, etc.) the word "prognosis," as illustrated by the highlight 126. While the user selects a word in this example, the user may select a phrase in other embodiments. In response to the selection, the device 104(1) displays the medical definition 128 of this word. As illustrated, this definition 128 includes an indication 302 that this definition is in fact the medical definition, rather than another type of definition (e.g., a standard definition, a science definition, etc.).

In this example, the eBook reader device 104(1) may display a definition from a dictionary when the user selects a word, although in other implementations the device may display synonyms from a thesaurus, information from an encyclopedia, or information any other reference work type. In still other implementations, the device 104(1) may prompt the user to select the type of the reference work from which the device should display information.

FIG. 3 also illustrates that the definition 128 includes an icon 304 ("More") that, when selected, allows the user to view additional definitions of the word "prognosis."

Figure 4:
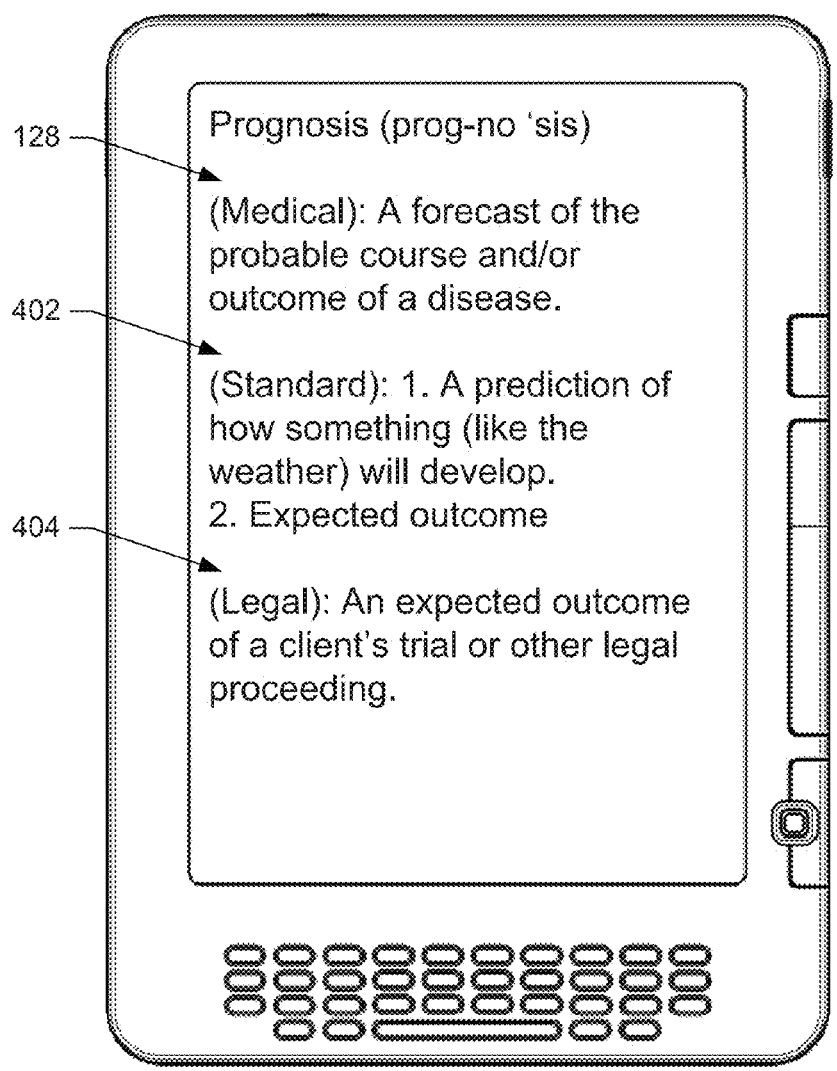
FIG. 4 illustrates an example user interface rendered by the device of FIG. 3 after the user has selected to view "more" definitions of the illustrated word "prognosis." As shown, in response the device displays definitions of "prognosis" in the medical sense, the standard sense, and the legal sense.

FIG. 4 illustrates an example user interface rendered by the eBook reader device 104(1) after the user has selected to view "more" definitions of the word "prognosis." As shown, in response the device displays the definition 128 of this word in the medical sense first, followed by a definition 402 of the word in a standard sense, and a definition 404 of the word in a legal sense. Here, the order of the list is also based on the genre of the eBook, with the medical definition appearing first. In some instances, one or both of the feedback modules 118 and 216 may use the user's selection of the icon 304 as an indication that the eBook or the currently displayed portion of the eBook may need to be re-classified. For instance and as discussed above, this selection may alter the confidence level associated with the currently associated genre.

Figure 5:
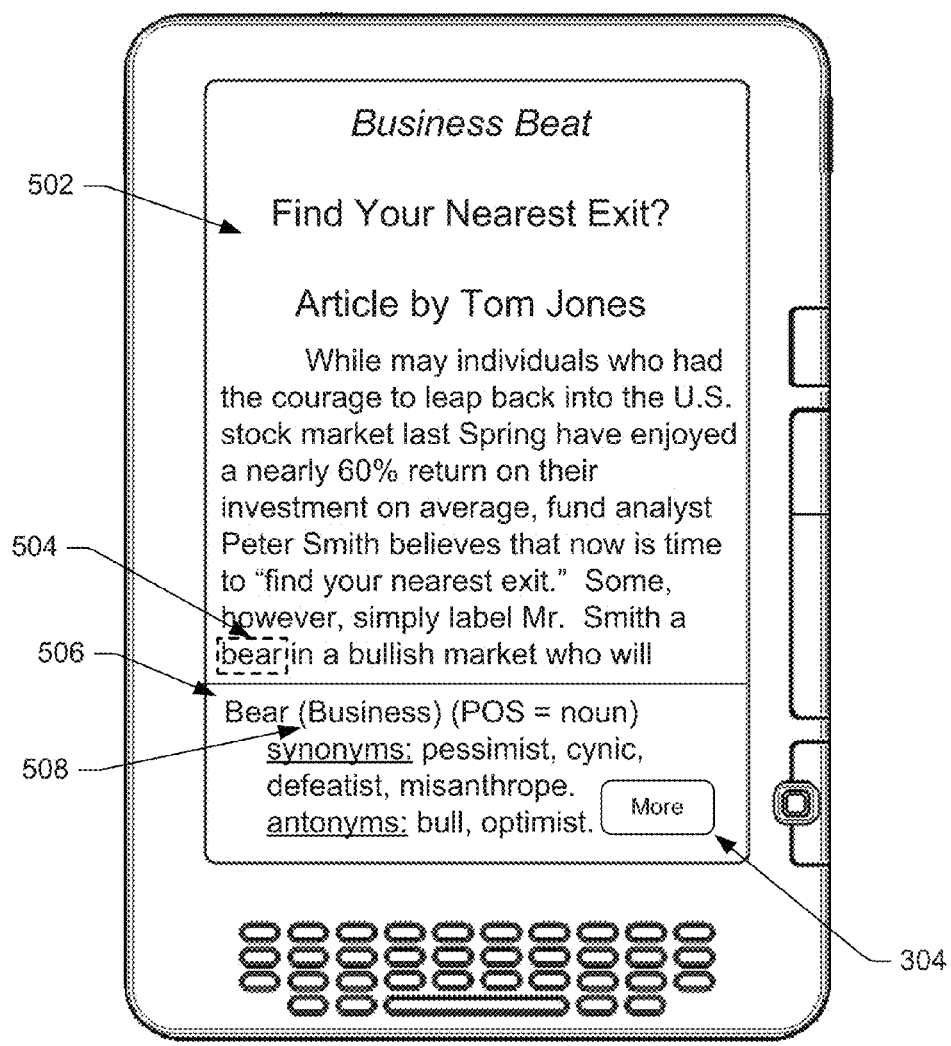
FIG. 5 illustrates another example user interface rendered by the devices of FIGS. 1 and 2. Here, the device is displaying an article from a periodical relating to "business." As such, when the user requests to look up in a thesaurus a word within the article, the device displays synonyms and antonyms from a business-related thesaurus entry.

FIG. 5 illustrates another example user interface rendered by the eBook reader device 104(1). Here, the device currently displays an eBook 502 comprising a periodical article that has been determined to relate the genre "business." As such, when the user requests information from a reference work regarding a word, phrase, or topic from the eBook 502, the device may display a reference work entry associated with the genre "business."

Here, for instance, the user requests (either explicitly or via default settings) to look up the word "bear" in a thesaurus, as indicated by a highlight 504. In response, the eBook reader device 104(1) displays an entry 506 from a thesaurus, the entry comprising synonyms and antonyms. As illustrated, an indication 508 indicates that this entry corresponds to a "business" use of the term "bear," as the synonyms include "pessimist, cynic, defeatist, misanthrope," while the antonyms include "bull, optimist." This is contrasted with the standard use of the term "bear" in the English language, having synonyms of bear "stand, stomach, tolerate, abide" and the like. However, by displaying a business-related thesaurus entry when the user reads a business-related eBook, the device 104(1) is more likely to provide the user with the information that she seeks. Furthermore, the device 104(1) also displays the "more" icon 304 to allow the user to view other thesaurus entry types associated with the word "bear" (e.g., the standard use entry, an entry related to animals, etc.).

Figure 6:
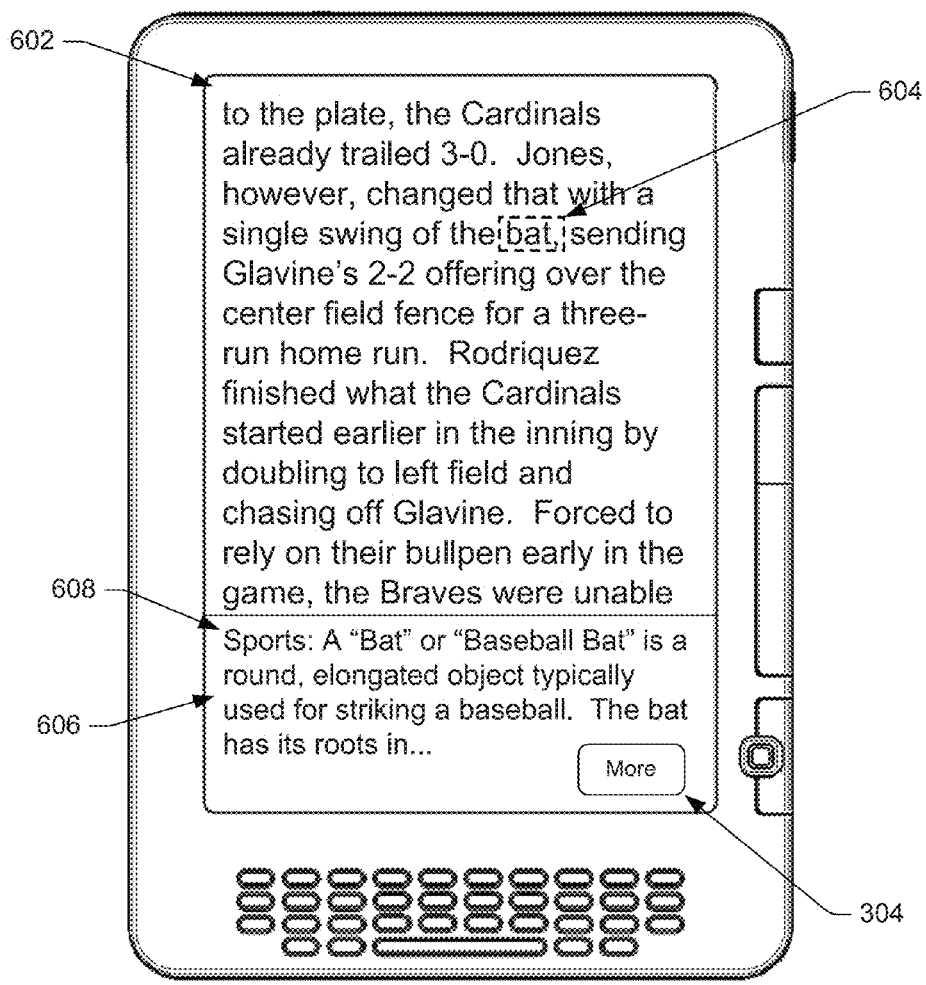
FIG. 6 illustrates another example user interface rendered by the devices of FIGS. 1 and 2. Here, the device is displaying a sports-related article. As such, when the user requests to look up in an encyclopedia a topic within the article, the device displays information about that topic from a sports-related encyclopedia entry.

FIG. 6 illustrates another example user interface rendered by the eBook device 104(1). Here, the device 104(1) is displaying an eBook 602 in the form of an article that has been determined be associated with a "sports" genre. Here, the user requests to look up the topic "bat" in an encyclopedia, as indicated by a highlight 604. In response, the device 104(1) displays an entry 606 from a sports-related encyclopedia that explains the history and importance of a "baseball bat." The eBook device 104(1) also displays an indication 608 that the entry 606 resides in a sports-related encyclopedia, or that the entry is sports-related entry in a general encyclopedia.

Again, the device also displays the "more" icon that, when selected, causes the device to display other articles associated with the term "bat," such as an article about the nocturnal mammal In instances where the currently displayed eBook 602 has user been classified as related to an "animal" genre, the device 104(1) may instead display the animal-related encyclopedia entry first, rather than the illustrated sports-related entry 606.

Example Process

Figure 7:
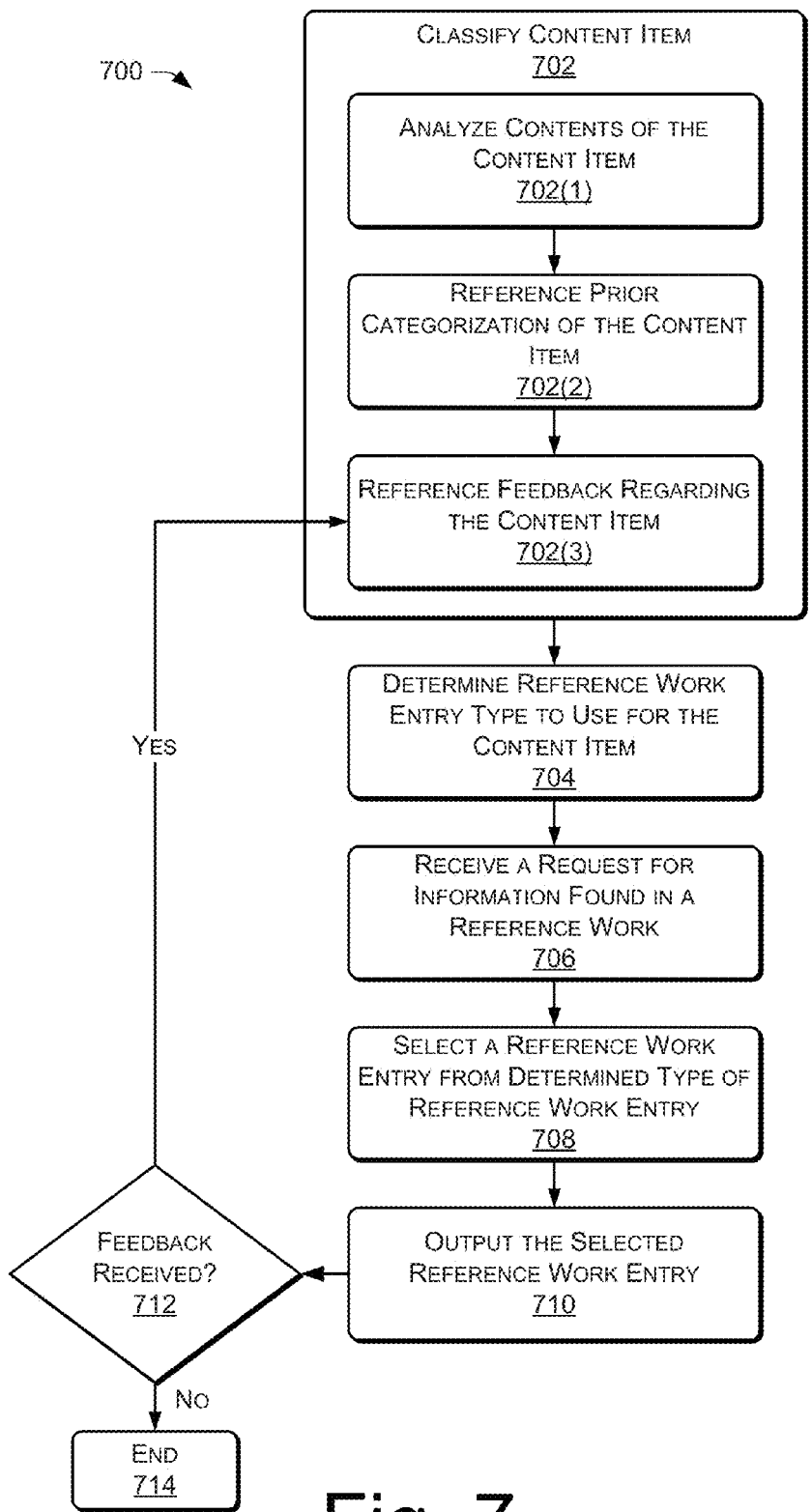
FIG. 7 is a flow diagram showing a process of classifying a content item according to, for example, a genre and determining, based on the classification, a type of reference work entry to use for the content item when a user requests information associated with a word, phrase, or topic found within the content item.

FIG. 7 illustrates an example process 700 for implementing the techniques described above of providing context-sensitive reference work entries. This process is illustrated as a logical flow graph, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 700 is described with reference to the architecture 100 of FIG. 1, although other architectures may implement this process.

Process 700 includes an operation 702, which represents classifying a content item as belonging to one or more genres, such as one or more of the genres discussed above. This analyzing may include one or a combination of sub-operations 702(1), 702(2), and 702(3). Classifying a content item may include, for instance, analyzing contents of the content item at sub-operation 702(1). This may include analyzing a content item for key words and comparing these key words to sets of key words associated with different respective genres. Sub-operation 702(2), meanwhile, may include referencing a prior categorization of the content item, such as from an electronic catalog of content items. Finally, sub-operation 702(3) may include referencing feedback regarding the content item itself, as discussed above.

After classifying the item, an operation 704 represents determining a reference work entry to use for the content item based at least in part on the classified genre of the item. For instance, if the item has been classified as "legal," operation 704 may determine that a "legal" reference work entry should be used. Conversely, if the reference work is classified as "thriller," then operation 704 may determine that a "standard" reference work entry should be used.

Next, an operation 706 represents receiving a request for information found within a reference work regarding a word, phrase, or topic found within the content item. This may include, for example, receiving a request for a definition of a word from a dictionary, synonyms or antonyms for the word from a thesaurus, information regarding a topic from an encyclopedia, a map from an atlas, or the like.

Operation 708, meanwhile, represents selecting a reference work entry from the determined type of reference work entry type. For instance, after the user requests to receive a definition of the word "prognosis" found within a medical-related book, operation 708 may select the medical definition of "prognosis." Next, an operation 710 represents outputting (visually, audibly, etc.) the selected reference work entry, such as the medical definition of the term "prognosis." Again, this outputting may comprise outputting multiple definitions of the word in an order based at least in part on the classified genre(s) of the content item. For instance, operation 710 may output multiple definitions of the word "prognosis," with the medical definition being displayed first or more prominently in the list relative to the other definitions.

Operation 712 represents querying whether feedback (e.g., user feedback) has been received in response to the output of the reference work entry. For instance, operation 712 may query whether the user decided to view additional definitions of the word "prognosis." If so, then this feedback is fed back to the classification block to potentially alter the classification of the content item. If no feedback is received, then the process 700 ends at operation 714.

Surfacing Reference Work Entries on Touch-Sensitive Displays

Example eBook Reader Device

Figure 8:
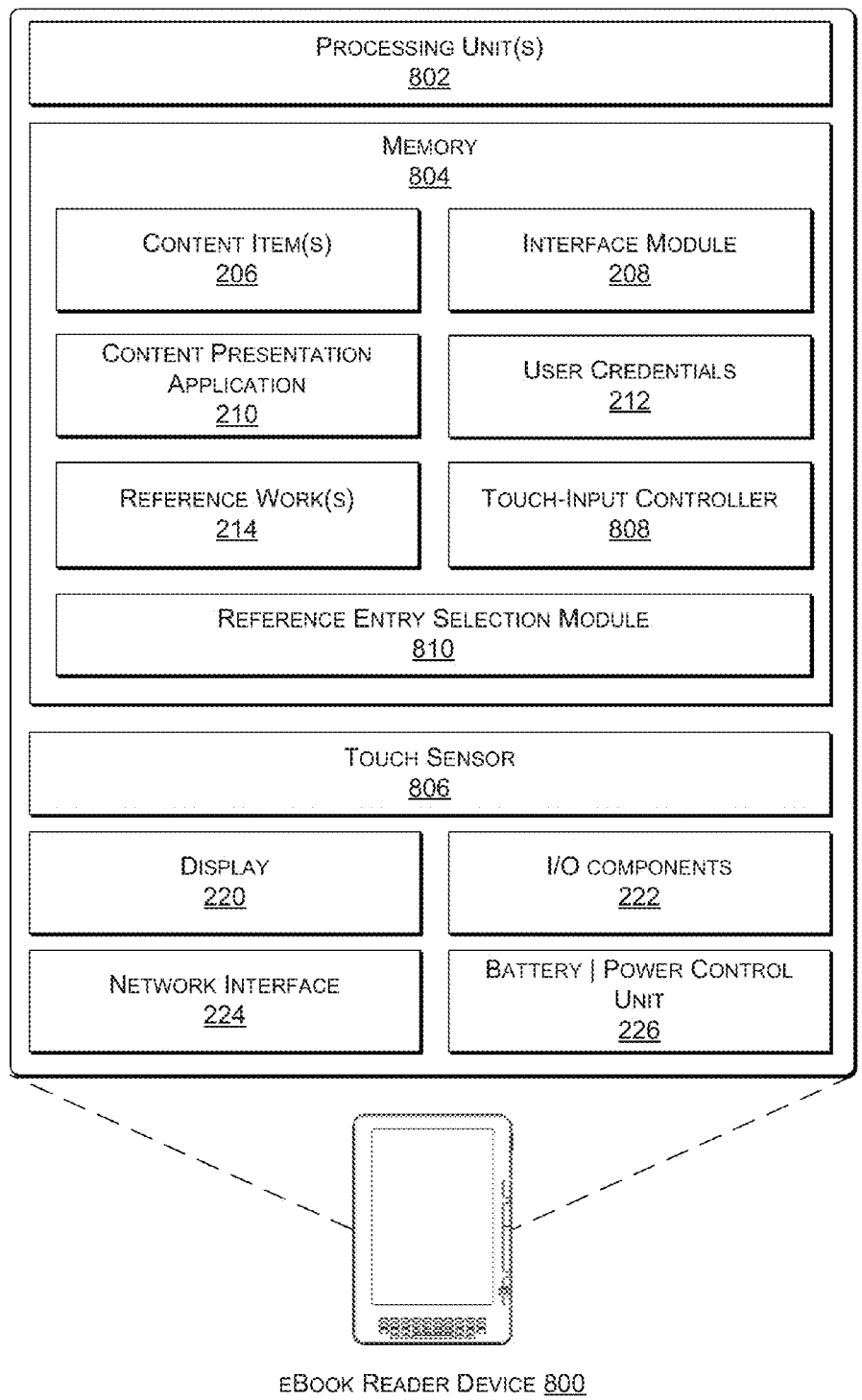
FIG. 8 is a block diagram of selected modules of an example eBook reader device that may implement a touch-sensitive display and that is capable of outputting different reference work entries based on an amount of force applied to the touch-sensitive display.

FIG. 8 is a block diagram of selected modules of an eBook reader device 800 that may implement a touch-sensitive display and that is capable of outputting different reference work entries based on an amount of force applied to the touch-sensitive display. The illustrated eBook reader device 800 may include several similar or identical components as the eBook reader device 104(1) described above.

In this example, the eBook reader device 800 is a dedicated, handheld eBook reader device, although other electronic devices may implement these techniques and, hence, may include some of the functionality described herein. For instance, mobile telephones, tablet computers, laptop computers, desktop computers, personal media players, portable digital assistants (PDAs), kiosks or any other fixed or mobile type of electronic device may implement the components and techniques described below.

In a basic configuration, the example eBook reader device 800 includes one or more processing units 802 and memory 804. In addition, the eBook reader device 800 may include a touch sensor 806 that enables a user of the device to operate the device via touch inputs. In some instances, the touch sensor 806 and the display 220 are integral to provide a touch-sensitive display that displays content items (e.g., eBooks) and allows users to navigate the content items via touch inputs on the display.

The memory 804 may be used to store any number of functional components that are executable on the processing unit(s) 802, as well as data and content items that are rendered by the eBook reader device 800. Thus, the memory 804 may store an operating system and an eBook storage database to store the one or more content items 206 described above, such as eBooks, audio books, songs, videos, still images, and the like.

A content presentation application 210 renders the content items 206. The content presentation application 210 may be implemented as various applications depending upon the content items. For instance, the application 210 may be an electronic book reader application for rending electronic books, an audio player for playing audio books or songs, a video player for playing video, and so forth.

The memory 804 may also store user credentials 212. The credentials 212 may be device specific (set during manufacturing) or provided as part of a registration process for a service. The credentials may be used to ensure compliance with DRM aspects of rendering the content items 206.

The memory 804 also stores (persistently or temporarily) one or more reference works 214, such as one or more dictionaries, thesauruses, encyclopedias, atlases, gazetteers, and the like. In some instances, the memory 204 stores multiple categories of a particular kind of reference work. For instance, the memory 204 may store a standard dictionary (e.g., Merriam-Webster® English Dictionary), a medical dictionary, a legal dictionary, a science dictionary, a science-fiction dictionary, an engineering dictionary, a foreign language dictionary, a business dictionary, a chemistry dictionary, a mathematics dictionary, and the like. In other instances, a single kind of reference work may contain multiple reference work entry types. For instance, a single dictionary may store, for one or more of the words therein, a standard dictionary entry, a medical dictionary entry, a legal dictionary entry, a science dictionary entry, and the like. In still other instances, the device may store a dictionary that accompanies a particular eBook. For instance, the device may store a dictionary that a publisher of a particular eBook creates for that particular eBook or for a particular series of eBooks.

The memory 804 may also include the interface module 208 that, as described above, provides for user operation of the device 104(1). One feature of the interface module 208 allows a user to request to receive information from a reference work regarding a word, phrase, or topic found within one of the content items 206. For instance, the interface module 208 may allow the user to request a definition of a word from a dictionary, synonyms from a thesaurus, a map from an atlas, and the like.

The interface module 208 may facilitate textual entry of request (e.g., via a cursor, controller, keyboard, etc.), audible entry of the request (e.g., via a microphone), or entry of the request in any other manner.

The memory 804 also stores a touch-input controller 808 to detect touch inputs received via the touch sensor 806 and, in some instances to measure of a force of the touches. In some instances, the touch-input controller 808 is configured to detect multiple touches on the touch sensor 806 as well as to measure an amount of force of each of the touches.

The eBook reader device 800 also stores a reference entry selection module 810 that is executable on the processing unit(s) to select a particular type of reference work entry in response to receiving an indication of a touch input. For instance, in response to the user selecting a particular portion of a rendered content item via a touch input, the reference entry selection module 810 may select a particular type of reference work entry to output based on a measured force of the touch input. For example, if a user selects a particular word on the touch-sensitive display, the module 810 may map the amount of force of the touch to one of multiple different reference work entries.

In one specific example, the module 810 outputs a dictionary definition of the word in response to the user providing a first amount of force, a thesaurus entry for the word in response to the user providing a greater amount of force, and an encyclopedia entry for the word in response to the user providing an even greater amount of force. Or, the module 810 may select and output multiple different reference work entries within a same type of reference work. For instance, the module 810 may output a medical definition of a word in response to a touch input having a first force, a standard definition of the word in response to a touch input having a greater force, and a legal definition of the work in response to a touch input having an even greater force.

As such, the reference entry selection module 810 allows a user to toggle through multiple reference work entries for a particular word, phrase, or topic by providing additional force to the touch-sensitive display. The order and substance of the outputted reference work entries may be configurable by a user of the device, may be set by a publisher or distributor of a corresponding content item, or the like. Furthermore, while a few example configurations have been described, multiple other configurations may also be implemented.

In some instances, the reference entry selection module 810 selects a reference work entry to output based on factors in addition to a first touch input. For instance, a user may select a word or other portion of a content item on touch-sensitive display and, in response, the module 810 may select and output a first reference work entry. Thereafter, the user may provide an additional input and, in response, the module 810 may select and output a different reference work entry.

The additional input may comprise an additional touch, the user activating a button on the keypad, the user orally stating a command, or any other type of user input. As such, the user is able to toggle through multiple reference work entries by providing an input to the touch sensor 806 and thereafter providing additional inputs to the touch sensor 806 and/or the interface module 208. For instance, where the touch sensor 806 is capable of detecting and interpreting multiple coincident touches, the user may place a first finger on the touch sensor 806 to cause display of a first reference work entry and then may toggle through other reference work entries by tapping another finger on the touch sensor 806.

In addition, the reference entry selection module 810 may select a reference entry to output based on other characteristics. For instance, the module 810 may select a particular entry to output based on a current location of the device, as determined by a GPS system resident on the device, signal triangulation, or any other location-sensing method.

FIG. 2 further illustrates that the eBook reader device 800 may include the display 220, which may be passive, emissive or any other form of display as discussed above. Also as discussed above, the display 220 and the touch sensor 806 may couple to form a touch-sensitive display. That is, the touch sensor 806 may reside underneath or above the display 220 in some instances, or may reside adjacent to the display in other instances.

The eBook reader device 800 may further be equipped with various input/output (I/O) components 222. Such components may include various user interface controls (e.g., buttons, a joystick, a keyboard, etc.), audio speakers, connection ports, and so forth. In addition, a network interface 224 supports both wired and wireless connection to various networks, such as cellular networks, radio, WiFi networks, short range networks (e.g., Bluetooth), IR, and so forth. The network interface 224 may allow a user of the device 800 to download content items from the content item service 106.

The eBook reader device 800 also includes a battery and power control unit 226. The battery and power control unit operatively controls an amount of power, or electrical energy, consumed by the eBook reader device. Actively controlling the amount of power consumed by the reader device may achieve more efficient use of electrical energy stored by the battery.

Example User Interfaces and Processes

Figure 9:
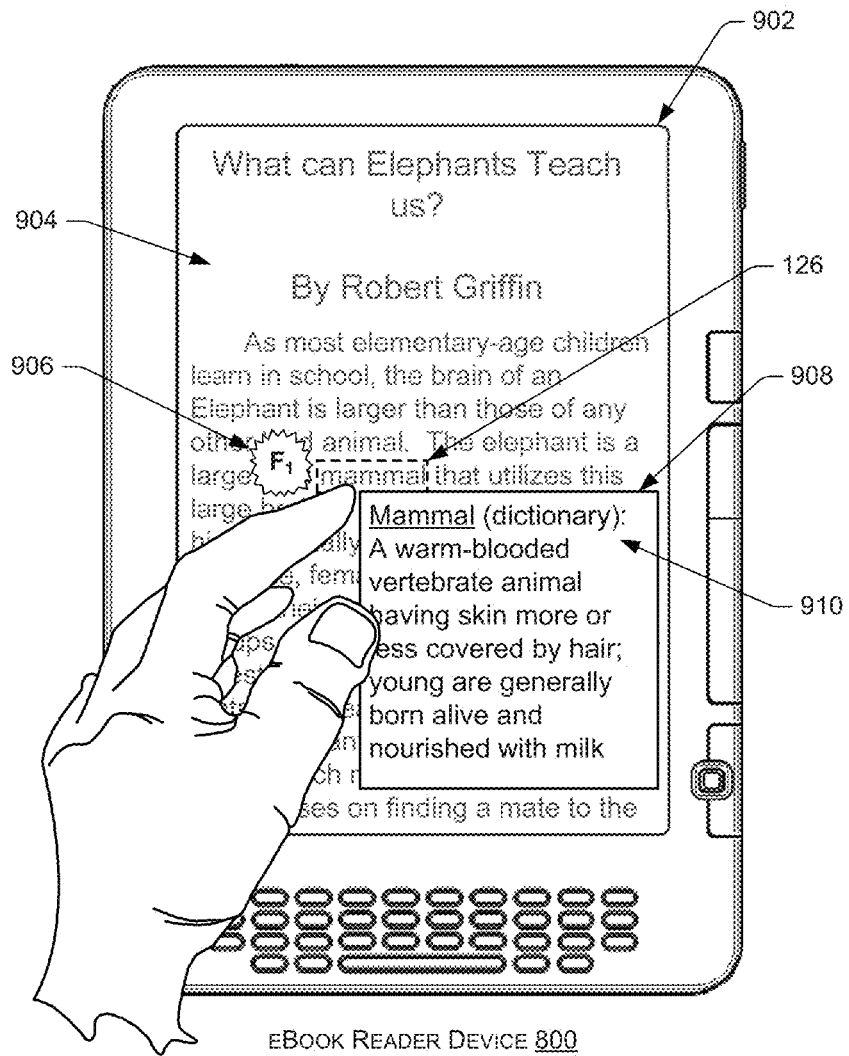
FIG. 9 illustrates an example user interface rendered by the device of FIG. 8 after a user has made a selection of a word on the touch-sensitive display of the device. Here, the device measures an amount of force of the selection and outputs a particular type of reference work entry based on this measured amount of force.

FIG. 9 illustrates an example user interface rendered by the device 800 of FIG. 8. As illustrated, the device includes a touch-sensitive display 902 that renders an eBook 904. During rendering of the eBook 904, a user makes a selection of a word on the touch-sensitive display 902, as illustrated by the highlight 126. In response, the touch-input controller 808 of the device 800 measures an amount of force 906 of the selection and provides this measured amount to the reference entry selection module 810. This module 810 may then map this particular amount of force to a particular type of reference work entry to output. For instance, the module 810 may output a first type of reference work entry for a touch-input having a measured force within a first range, a second type of reference work entry for a touch-input having a measured force within a second range, and so forth.

In other instances, meanwhile, the controller 808 may measure the amount of force 906 of the initial touch and may use this amount as a baseline for future touches. For instance, the device 800 may select and output a first type of reference work entry in response to detecting a first touch, regardless of the amount of force of the touch. Thereafter, the device 800 may output other reference work entries in response to detecting touches having greater or lesser forces than the initial "baseline" touch.

In either instance, once the module 810 selects a reference work entry type, the module 810 may output the entry to the user. In the illustrated example, the module 810 has overlaid the entry onto the touch-sensitive display 902, although other implementations may output the entry in other ways. In this example, the reference work selection module 810 has selected, based on the amount of force 906 of the touch input, a dictionary entry 908 to output on the display. As such, FIG. 9 illustrates that the device 800 outputs the dictionary entry 908 for the selected word "Mammal" FIG. 9 also illustrates that the entry 908 provides an indication 910 of the source of the reference work entry.

Figure 10:
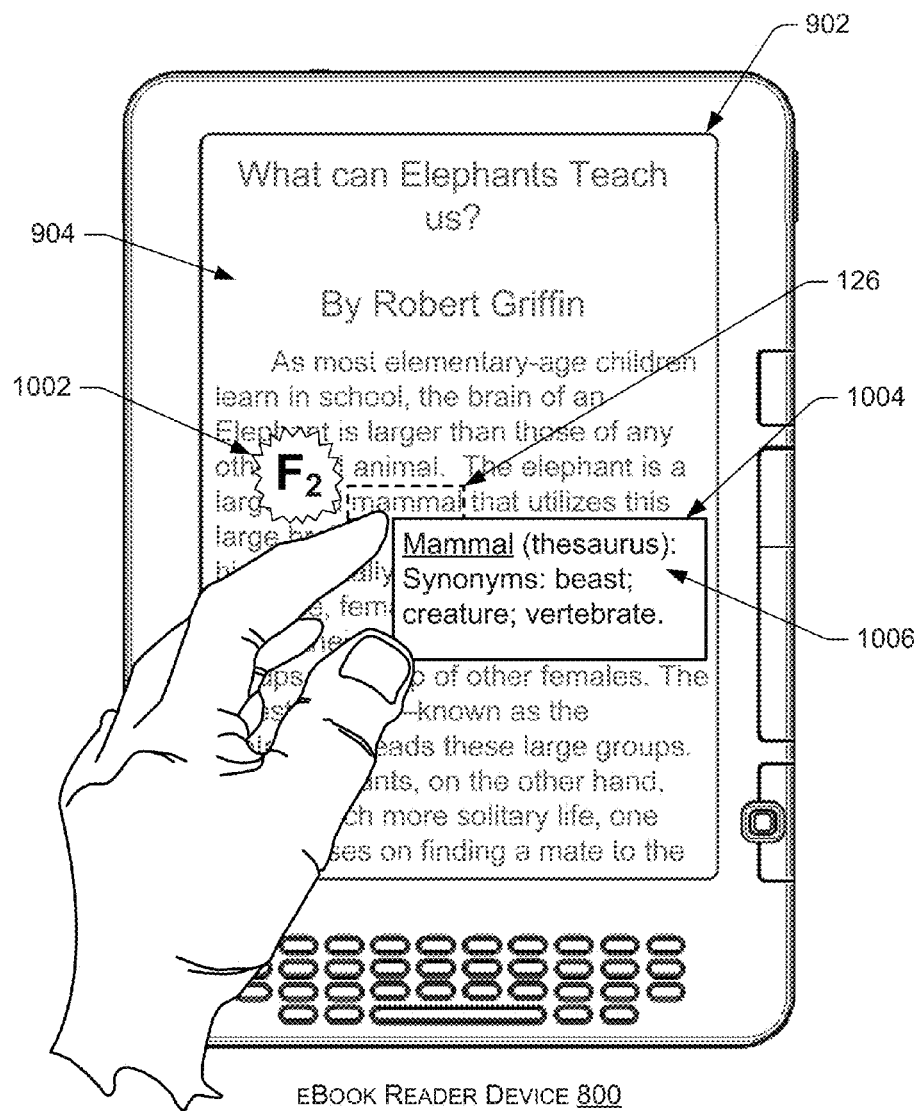
FIG. 10 illustrates an example user interface rendered by the device of FIG. 8 after the user has increased the amount of force on the selected word. Here, the device outputs a second, different type of reference work entry based on this greater amount of force.

FIG. 10 illustrates an example user interface rendered by the device 800 after the user has increased the amount of force on the selected word. As illustrated, the user now selects the word "mammal" with an amount of force 1002 that is greater than the amount of force 906. The user may or may not have maintained contact with the touch-sensitive display 902 between the applications of these two forces. In response to the second input of the user, the touch-input controller 808 has detected the greater amount of force 1002 and provided this information to the reference entry selection module 810. In response, the module 810 has mapped this amount of force to a particular reference work entry.

Here, the module 810 has selected a thesaurus entry 1004 for output on the touch-sensitive display 902. As illustrated, the thesaurus entry includes an indication 1006 of the source of entry, along with both synonyms and antonyms of the word "mammal" While FIG. 10 illustrates that the device 800 outputs the thesaurus entry 1004 in response to detecting the amount of force 1002 on the location of the display 902 associated with the word "mammal," other implementations may output any other type of reference work entry. In addition, other implementations may output the thesaurus entry in response to detecting a lesser amount of force.

Figure 11:
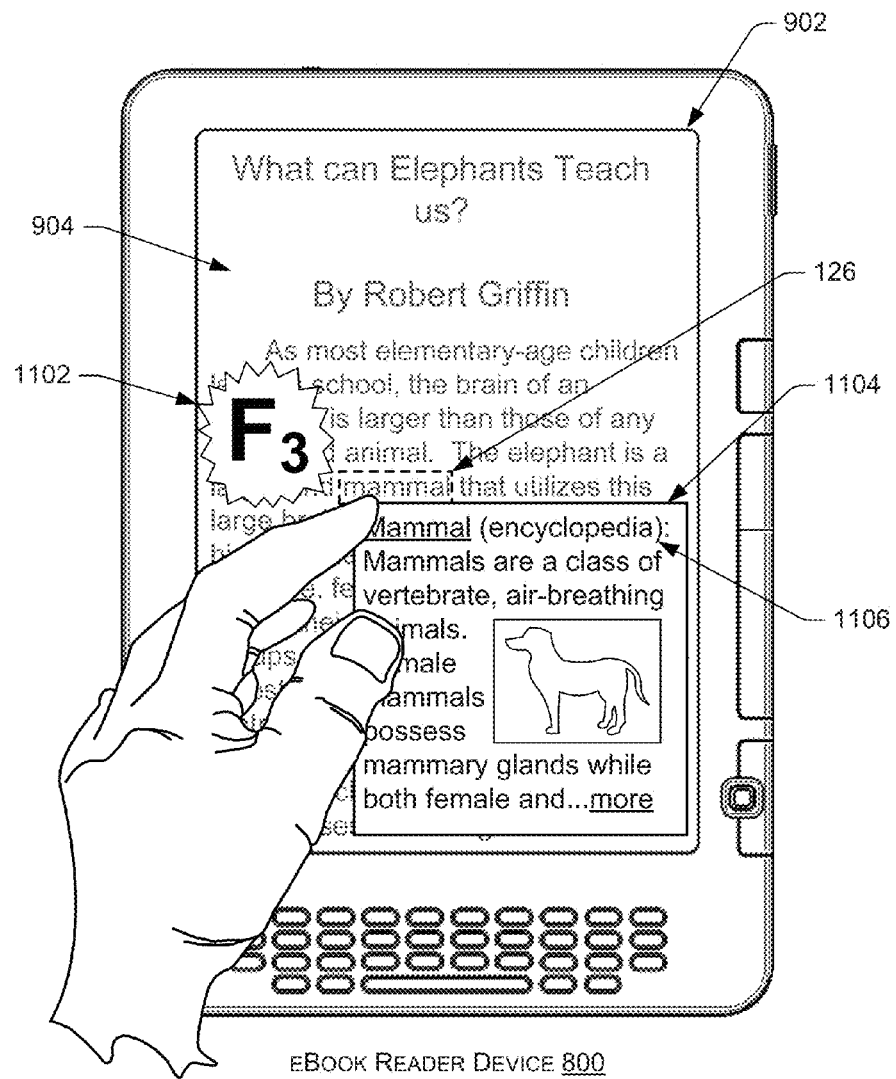
FIG. 11 illustrates an example user interface rendered by the device of FIG. 8 after the user has yet again increased the amount of force on the selected word. Here, the device outputs a third, different type of reference work entry based on this even greater amount of force.

FIG. 11 illustrates yet another example user interface rendered by the device 800 after the user has yet again provided an input having an increased amount of force 1102 on the selected word "mammal" After the touch-input controller 808 measures the increased force 1102 and provides this information to the reference entry selection module 810, the module 810 selects a third, different type of reference work entry to output on the device. In the illustrated example, the device 800 outputs an encyclopedia entry 1104 for the word "Mammal," which again includes an indication 1106 of the source of the entry.

With use of the described techniques, the user of the device 800 is able to toggle through multiple different reference work entries associated with a particular word, phrase, image, or other portion of a content item. For instance, the user may toggle through a dictionary entry, a thesaurus entry, an encyclopedia entry, and/or any other type of reference work entry by altering the amount of force applied to the touch-sensitive display 902. In addition, the device 800 may store locally some or all of the underlying reference works, or the device 800 may request and receive the surfaced entries over a network on an on-demand basis.

Figure 12:
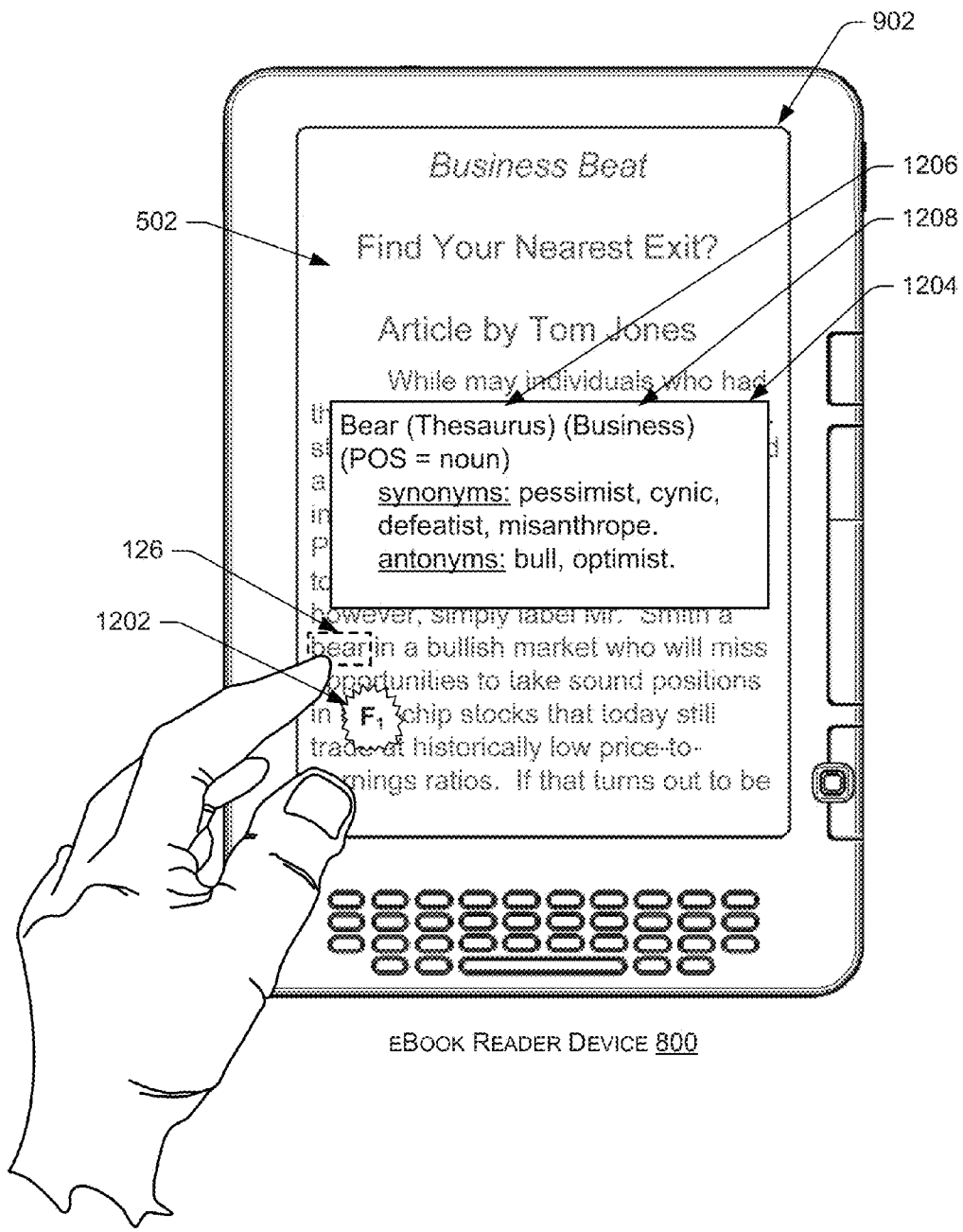
FIG. 12 illustrates another example user interface rendered by the device of FIG. 8 after a user has made a selection of a word on the touch-sensitive display of the device. Here, the device measures an amount of force of the selection and outputs a particular context-sensitive reference work entry based on this measured amount of force.

FIG. 12 illustrates another example user interface rendered by the device 800. Here, the touch-sensitive display 902 of the device 800 renders the eBook 504 discussed with reference to FIG. 5 above. Here, the user selects (via a touch input) the word "bear" on the display 902, as indicated by the highlight 126. In response, the touch-input controller 808 measures an amount of force 1202 of the selection. Based at least partly on the amount of force 1202 of the selection, the reference entry selection module 810 outputs a thesaurus entry 1204 for the word "bear," which includes an indication 1206 of the type of reference work being utilized.

In this instance, the module 810 has additionally determined that the eBook 502 is associated with the genre of "business." The module 810 may make this determination using any of the techniques described above, such as a by referencing a prior categorization of the eBook 502, by analyzing key words of the eBook 502, or the like. After making this determination, the reference entry selection module 810 outputs a business-related thesaurus entry 1204, rather than a standard thesaurus entry. As such, the entry 1204 provides business-based synonyms for the term "bear," such as pessimist, cynic, and defeatist. In addition, the entry 1204 includes an indication 1208 that this entry 1204 corresponds to a "business" use of the term.

Figure 13:
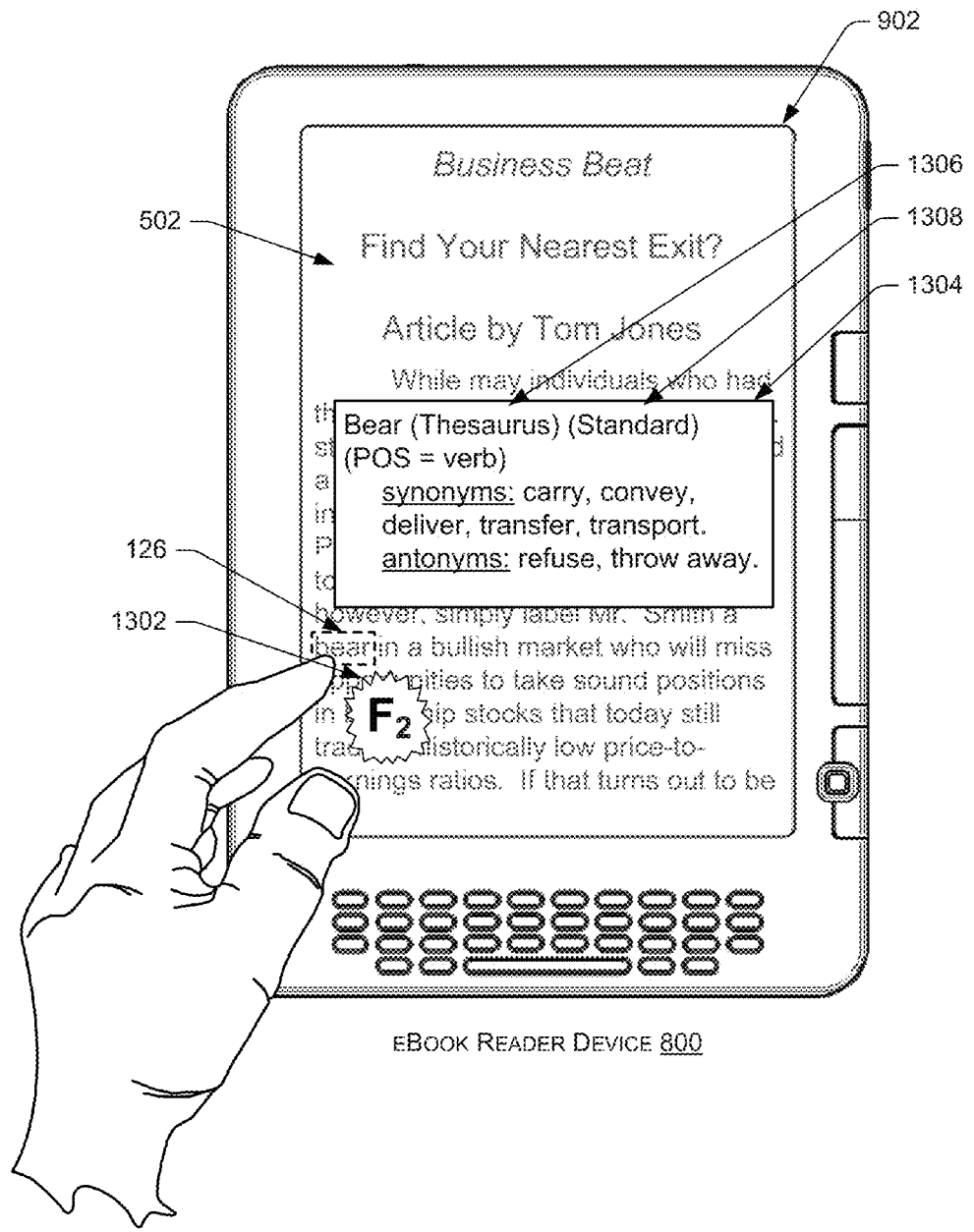
FIG. 13 illustrates another example user interface rendered by the device of FIG. 8 after the user has increased the amount of force on the touch-sensitive display. Here, the device outputs a second, different context-sensitive reference work entry based on this greater amount of force.

FIG. 13 illustrates another example user interface rendered by the device 800 after the user has provided additional force on the touch-sensitive display 902. Here, the touch-input controller 808 measures an amount of force 1302 provided by the additional input and provides this information to the reference entry selection module 810. In response, the module 810 selects a reference work entry to output on the device 800. In this instance, the module 810 again outputs a thesaurus entry 1304 (as shown by indication 1306). This thesaurus entry, however, is associated with a standard use of the term "bear" (as shown by indication 1308) and, as such, this entry includes synonyms such as carry, convey, and deliver.

As such, FIGS. 12-13 illustrate that the user is able to toggle through multiple different context-sensitive reference work entries by providing varying amounts of force on the touch-sensitive display. In combination with the techniques described above with reference to context-sensitive reference works, a user is able to view an initial reference work entry that has been determined to most likely relate to the illustrated eBook, while providing the user the ability to toggle through multiple other entries. For instance, the techniques may surface a business-related thesaurus entry for a business-related book, while allowing the user to toggle through other thesaurus entries for a same word by applying an increased or decreased force to the display 902.

Figure 14:
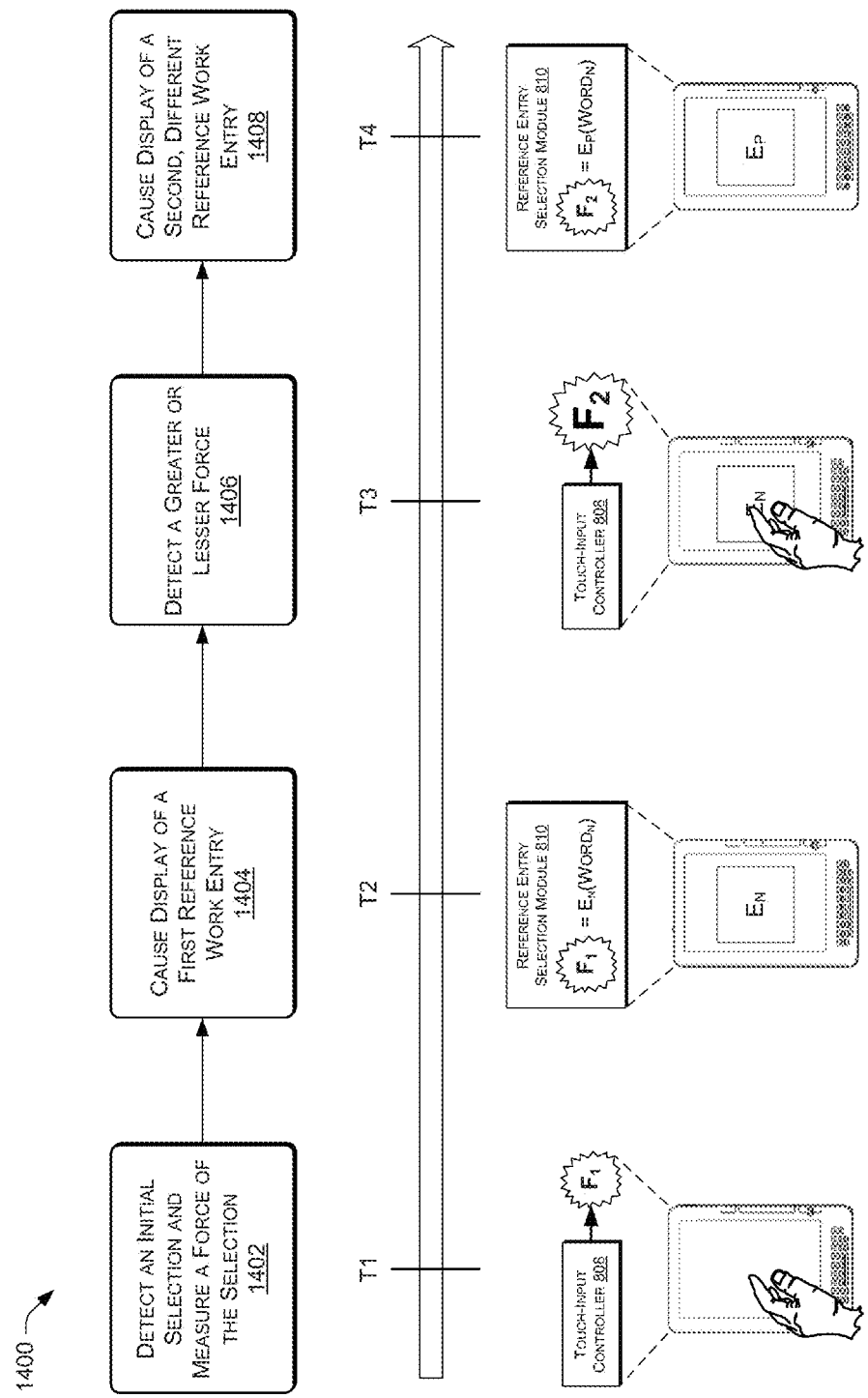
FIG. 14 is a flow diagram showing a process of selecting which of multiple reference work entries to output based on an amount of measured force associated with a selection.

FIG. 14 is a flow diagram showing a process 1400 of selecting which of multiple reference work entries to output based on an amount of measured force associated with a selection. This process (as well as the processes described below) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. While this process illustrates one example order in which the operations of the process may occur, the example order is not intended to be construed as a limitation, and any number of the described operations can be combined in any order and/or in parallel to implement the process.

For discussion purposes, the process 1400 is described with reference to the device 800 of FIG. 8, although other devices and architectures may implement this process.

At operation 1402, the device 800 detects an initial selection on a touch sensor and measures a force of the selection. For instance, a user of the device 800 may provide a touch input onto the touch-sensitive display of the device via a finger, stylus, or the like. This initial selection may select a particular portion of a content item, such as a word or phrase, a location on a map, a portion of an image, or any other portion of any type of content item.

At operation 1404, the device 800 causes display of a first reference work entry at least partly in response to detecting the initial selection. For instance, the device 800 may display the first reference work entry on the touch-sensitive display of the device, on another display of the device, or on another display of a different device. Further, in some instances, the device 800 selects the first reference work entry based at least in part on the measured force of the initial selection. In other instances, meanwhile, the device 800 selects the first reference work entry regardless of an amount of force. In these latter instances, the measured force of the initial selection may act as a baseline for future touch inputs.

In each of these instances, the displayed first reference work entry may also be based on a location of the initial selection on the touch sensor. For instance, if a user provides the touch input on a portion of a touch-sensitive display displaying the word "mammal," the device may output a reference work entry (e.g., a dictionary entry, an encyclopedia entry, etc.) associated with the word "mammal"

At operation 1406, the touch sensor of the device detects a force that is greater or lesser than the measured force of the initial selection. For instance, the user may have applied more force via her finger or a stylus, with or without removing her finger or stylus from touch sensor after making the initial selection.

At operation 1408 and in response to detecting the greater or lesser force, the device 800 causes display of a second, different reference work entry. Again, the device may display this entry on any display, such as on the touch-sensitive display of the device 800. Further, this entry may be selected based on an amount of force of the selection and/or based on a difference in force between the initial selection and the greater/lesser force. This second, displayed entry may also be based on the portion of the content item that the user selects.

In the example above, for instance, the device 800 may output a thesaurus entry for the word "mammal" in response to the user providing a greater amount of force at the location of the display displaying this word.

Figure 15:
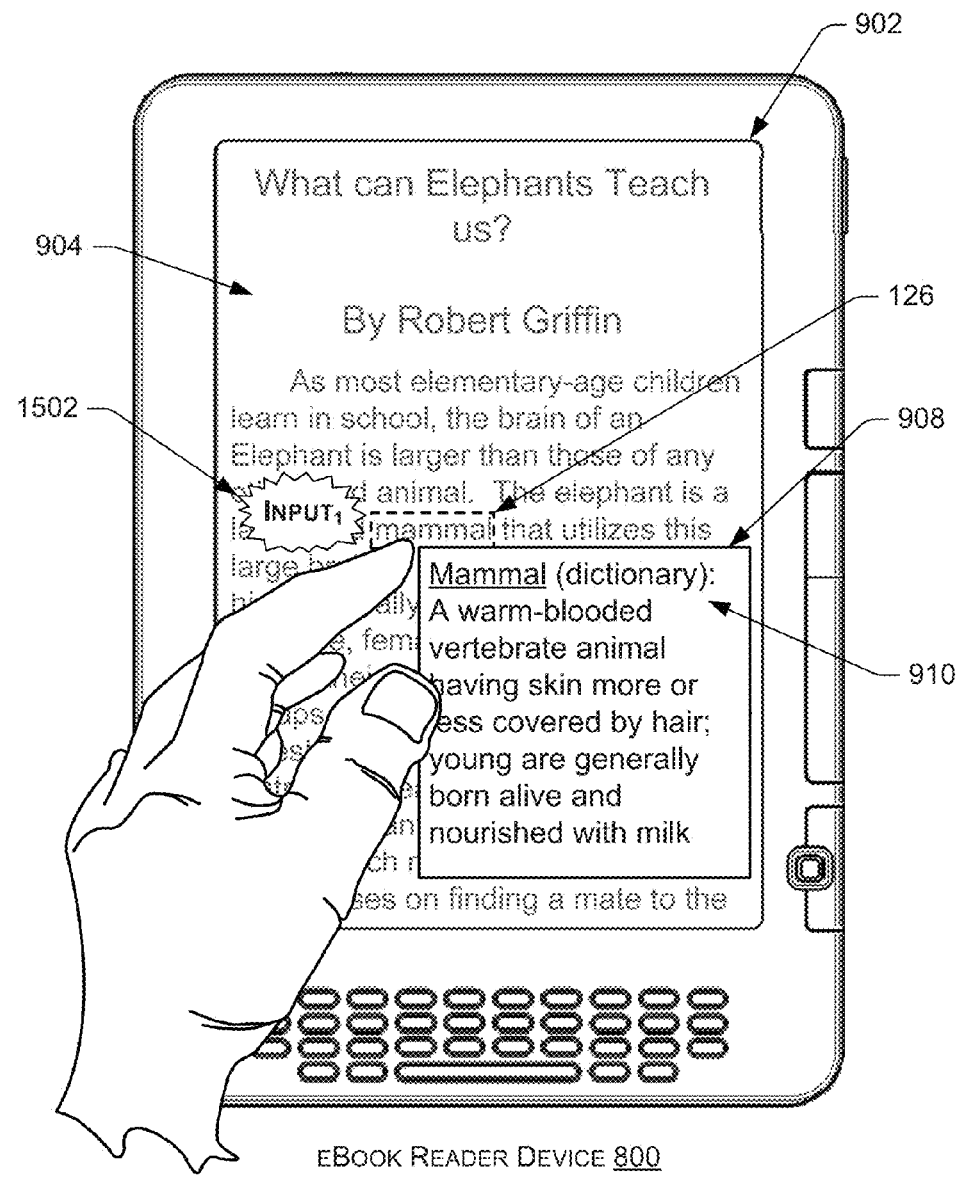
FIG. 15 illustrates an example user interface rendered by the device of FIG. 8 after a user has made a selection of a word on the touch-sensitive display of the device. Here, the device outputs a reference work entry based on this selection.

FIG. 15 illustrates yet another example user interface rendered by the device 800 of FIG. 8 after a user has made a selection of a word on the touch-sensitive display 902 of the device 800. As illustrated, the device 800 currently outputs the eBook 904 and the user provides a first input 1502 in the form of a touch on the touch-sensitive display 902. In response, the device 800 outputs a reference work entry associated with the selected word. In the illustrated example, the device 800 again displays a dictionary entry 908 for the selected word "mammal"

Figure 16:
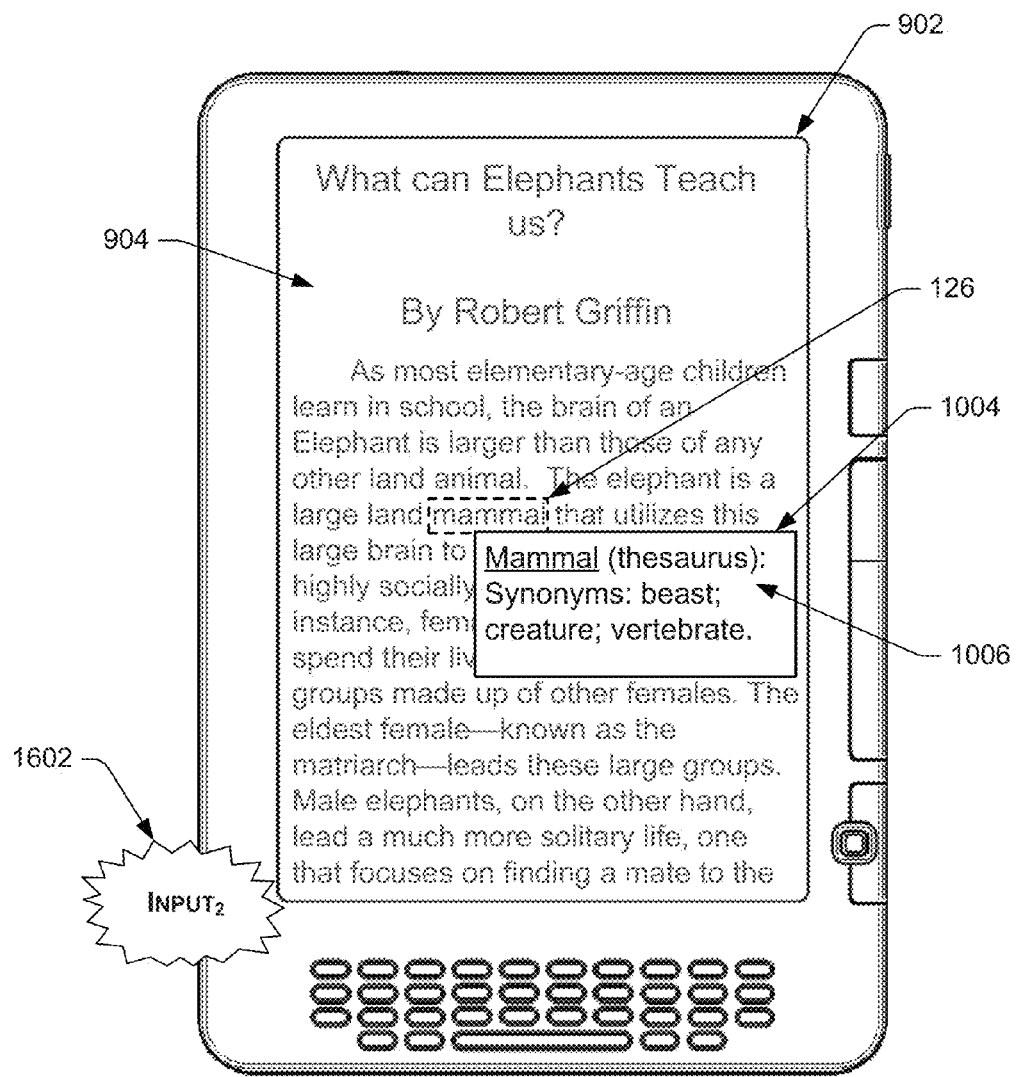
FIG. 16 illustrates an example user interface rendered by the device after the user has provided an additional input. In response, the device outputs a second, different reference work entry. This input may include more force on the display, an additional point of contact on the display, activation of a key on a keypad, an oral command spoken by the user or any other type of input.

FIG. 16 illustrates an example user interface rendered by the device 800 after the user provides an additional input 1602. This additional input may comprise additional force on the touch-sensitive display, a touch on the display that is coincident with the initial touch input, activation of a key on a keypad of the device 800, an oral command spoken by the user and captured by a microphone of the device 800, or any other type of input.

In response to the additional input 1602, the device 800 outputs a second, different reference work entry 1004. The device 800 may select this entry 1004 based on actual contents of the additional input 1602, or the device 800 may select this entry 1004 based on the entry 1004 being "next in line" for display.

In either instance, FIGS. 15-16 illustrate that a user of the device 800 is able to toggle through multiple reference work entries associated with a portion of a content item by providing a touch input and, thereafter, providing other preconfigured inputs. For instance, a user of the device may view a dictionary entry of a word by providing an initial touch input on the touch-sensitive display of the device. Thereafter, the user may toggle through multiple other reference work entries associated with the word by providing a second, coincident touch on the display. As such, the user could view a thesaurus entry by maintaining contact with her finger on the display and providing a first tap, an encyclopedia entry by providing a second tap, search engine results by providing a third tap, and so forth.

Conversely, the user could toggle through multiple different reference work entries by providing a touch input and then selecting a particular button on a keypad of the device. For instance, after providing a touch input, the user could select the "T" on the keypad to view the thesaurus entry for the word, the "E" on the keypad to view the encyclopedia entry of the word, and so forth. Conversely, the user may select a single button that toggles through these reference work entries in a preconfigured order.

In yet another example, the user could toggle through multiple different reference work entries by providing a touch input and then providing an oral command. For instance, the user could say aloud "thesaurus," "encyclopedia," "map," and so forth. In response to the microphone of the device capturing the command, the device 800 may process this request and output the requested reference work entry. Conversely, the user may provide a single command (e.g., "next") that, when received, causes the device to toggle through the reference work entries in a preconfigured order.

Figure 17:
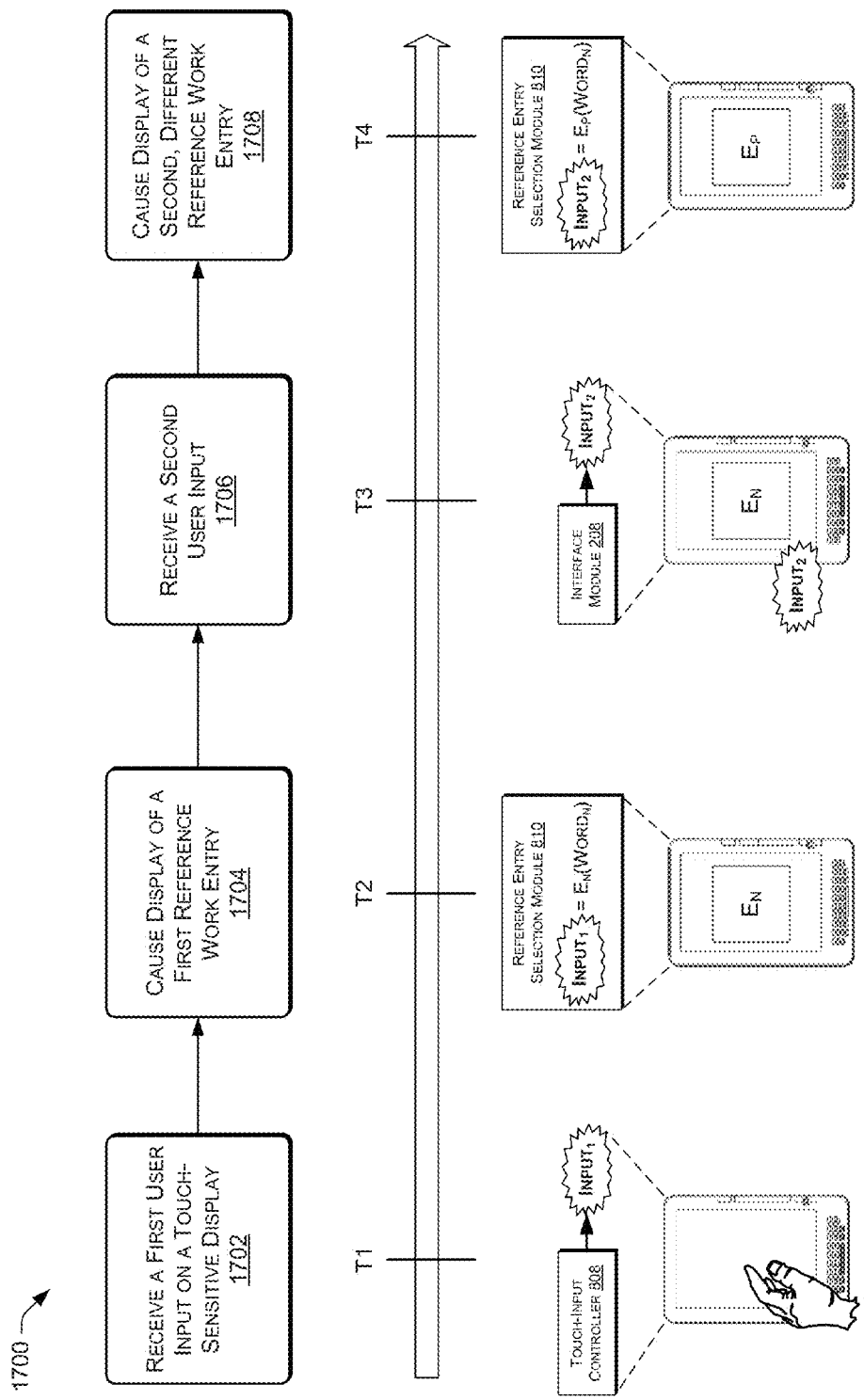
FIG. 17 is a flow diagram showing a process of outputting a first reference work entry in response to receiving a touch selection on a display and, thereafter, outputting a second, different reference work entry after receiving an additional input.

FIG. 17 is a flow diagram showing a process 1700 of outputting a first reference work entry in response to receiving a touch selection on a display and, thereafter, outputting a second, different reference work entry after receiving an additional input.

At operation 1702, the device 800 receives a first user input on a touch-sensitive display 902 of the device 800. For instance, the user may select a particular portion of a content item that the device outputs, such as a particular word or phrase of an eBook.

At operation 1704, the device causes display of a first reference work entry associated with the selected portion of the content item. For instance, if the user selects the word "mammal," the device 800 may display a dictionary entry or other reference work entry for this word. Conversely, if the user selects the word "Los Angeles," the device 800 may display the location of this city on a map.

At operation 1706, user provides and the device receives a second user input, which may or may not be coincident with the first input provided on the touch-sensitive display. For instance, the user may provide additional force on the display, may provide an additional point of contact or touch on the display, may activate a button on a keypad of the device, may orally speak a command, and so forth.

At operation 1708, in response to receiving the second input the device 800 causes display of a second, different reference work entry. In some instances, this reference work entry is also associated with the initially selected portion of the content item. For instance, the device 800 may display a thesaurus entry for a selected word after displaying a dictionary entry for the word at the operation 1704.

Figure 18:
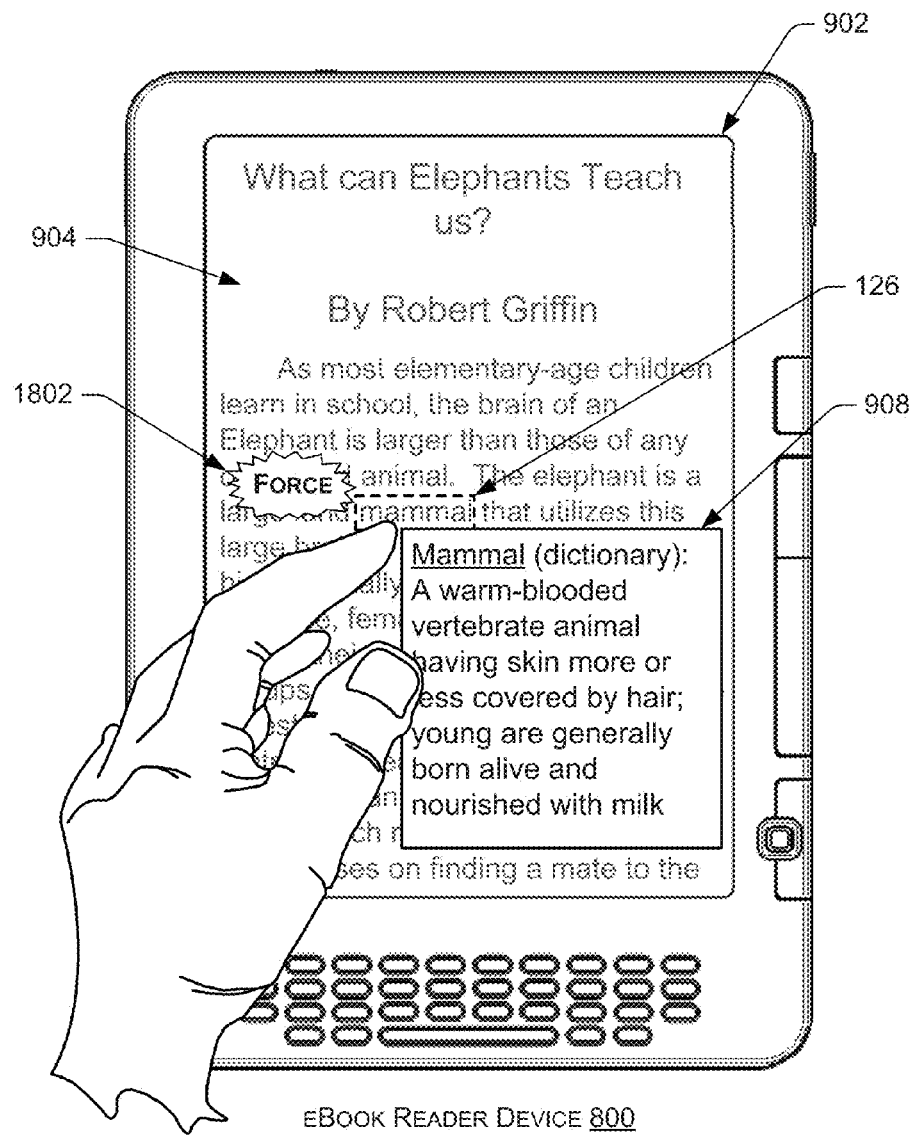
FIG. 18 illustrates an example user interface rendered by the device of FIG. 8 after a user has made a selection of a word on the touch-sensitive display of the device. Here, the device outputs a reference work entry after determining that an amount of force of this selection is less than a threshold force.

FIG. 18 illustrates an example user interface rendered by the device 800 of FIG. 8 after a user has made a selection of a word on the touch-sensitive display 902 of the device 800. In this example, the device 800 measures a force of the selection and determines whether to output a particular reference work entry in response to the selection, or whether to enable the user of the device 800 to select a reference work entry for output. For instance, the device 800 may determine whether a provided force is greater or less than a threshold force and, in response to this determination, may output the particular reference work entry or may enable the user to make the selection.

FIG. 18, for instance, illustrates that the device 800 outputs a reference work entry (e.g., the dictionary entry 908) after determining that an amount of force 1802 of this selection is less than a threshold force. This threshold force may be configurable by a user of the device 800 in some instances.

Figure 19:
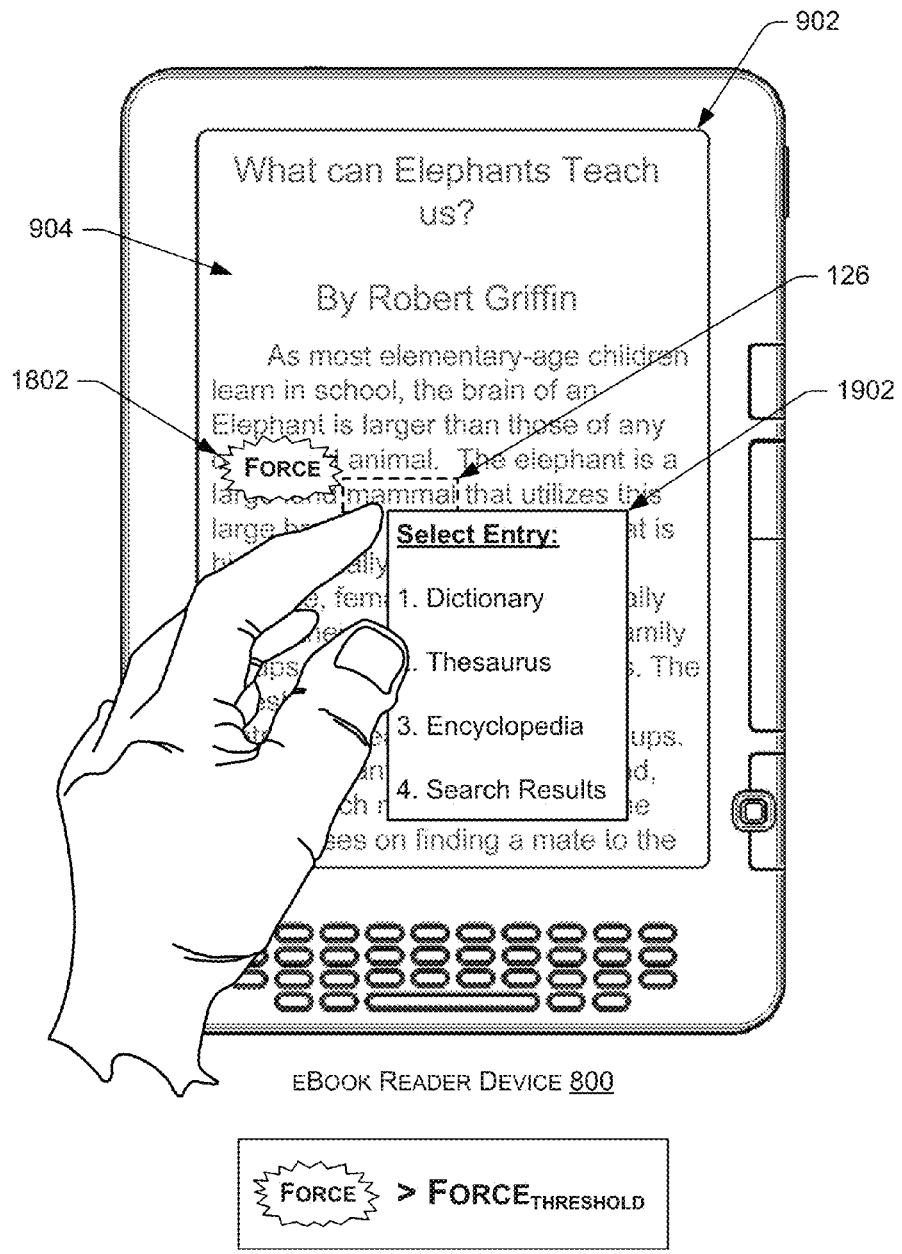
FIG. 19 illustrates an example user interface rendered by the device of FIG. 8 after a user has made a selection of a word on the touch-sensitive display of the device. Here, the device enables the user to select a reference work entry to output after the device determines that an amount of force of this selection is greater than a threshold force.

FIG. 19, meanwhile, illustrates an example user interface rendered by the device 800 after the device determines that an amount of force of this selection is greater than the threshold force. Here, the device 800 enables the user to select a reference work entry to output, each of which may be associated with the word "mammal" In this example, the device 800 displays a menu 1902 with selectable icons, such as "dictionary entry," "thesaurus entry," and the like. With the menu 1902, the user may select one of the icons to cause the device 800 to display the corresponding reference work entry. For instance, the user may select "encyclopedia entry" to view an encyclopedia entry for the word "mammal"

FIGS. 18-19 thus illustrate that the device 800 may determine whether to output an entry or whether to enable a user to select an entry based on an amount of force of a user's selection. While these figures illustrate that the device enables user selection in response to detecting a force that is greater than a threshold force, in other instances the device may operate in an opposite manner. That is, the device 800 may enable the user to select a reference work entry in response to detecting a force that is less than a threshold force. Similarly, in these instances, the device 800 may output a particular reference work entry in response to detecting a force that is greater than the threshold force.

Furthermore, while FIG. 19 illustrates one example manner that the user may select a reference work entry for output, the device 800 may enable this selection in a number of other ways. For instance, the device 800 may allow the user to orally state which reference work entry to output (e.g., "thesaurus") or may allow the user to make this selection in any other manner.

These techniques may also operate in conjunction with the techniques for toggling through the multiple reference work entries, described above. For instance, the device may output a first entry in response to a first amount of force, a second entry in response to a second, greater amount of a force, and the selectable menu 1902 in response to a third, even greater amount of force.

Figure 20:
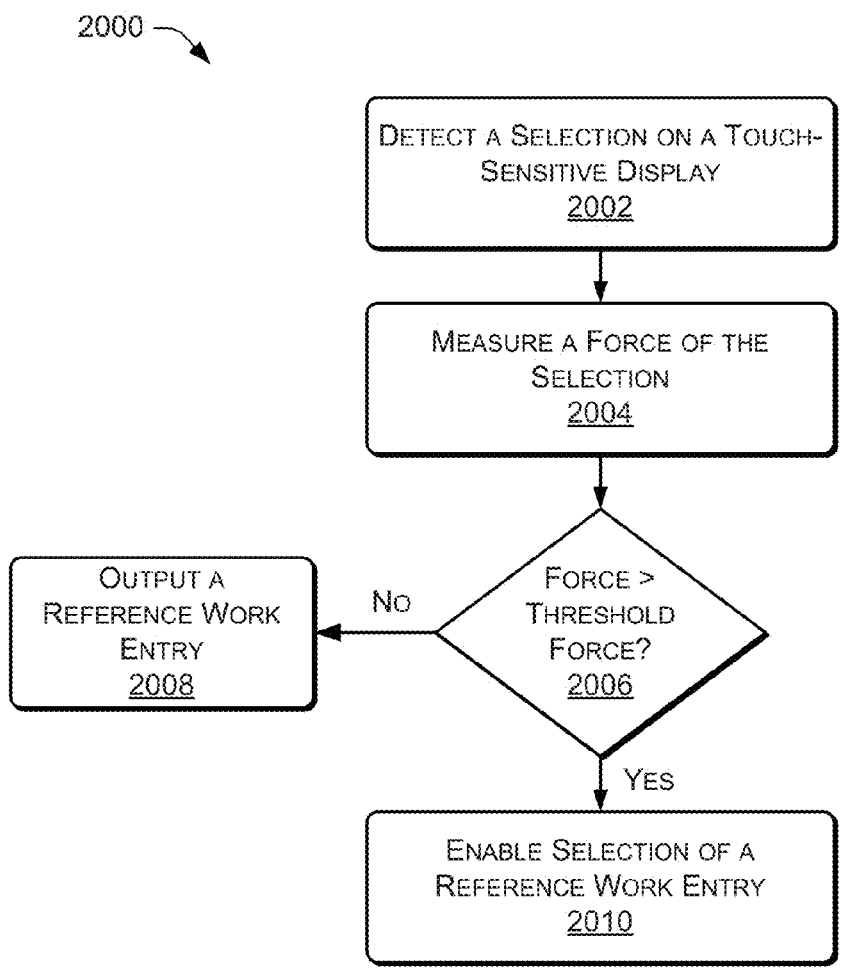
FIG. 20 is a flow diagram showing a process of determining whether to output a reference work entry or whether to allow a user to select which reference work entry to output based on an amount of force of a selection.

FIG. 20 is a flow diagram showing a process 2000 of determining whether to output a reference work entry or whether to allow a user to select which reference work entry to output based on an amount of force of a selection. The device 800 and/or a component in communication with the device 800 may perform this process in some instances.

At operation 2002, the device detects a selection on a touch-sensitive display of the device. For instance, the device may detect the user providing a touch input via her finger, a stylus, or the like. This selection may be associated with a particular portion of a content item being rendered by the device, such as a particular word or phrase of an eBook.

At operation 2004, the device measures an amount of a force of the selection. At operation 2006, the device then determines whether the measured amount of force is greater than or less than a preconfigured threshold value. In response to determining that the measured force is less than the threshold value, the device causes display of a reference work entry on the display at operation 2008. Conversely, in response to determining that the measured amount of force is greater than the threshold amount of force, the device 800 enables the user select an entry at operation 2010. For instance, the device 800 may output the selectable menu 1902 or may otherwise allow the user to select which reference work entry to display on the device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
   detecting an initial selection of a word being output by a touch-sensitive display and measuring a force of the initial selection on the touch-sensitive display;
   causing display of a first reference work entry associated with the word on the touch-sensitive display at least partly in response to the detecting of the initial selection;
   detecting a force on the touch-sensitive display that is greater or lesser than the measured force of the initial selection; and
   causing display of a second, different reference work entry associated with the word on the touch-sensitive display at least partly in response to the detecting of the greater or lesser force.

2. One or more non-transitory computer-readable media as recited in claim 1, wherein the greater or lesser force is detected at an area of the touch-sensitive display that displays the selected word.

3. One or more non-transitory computer-readable media as recited in claim 1, wherein the first reference work entry is from a first category of reference work and the second reference work entry is from a second, different category of reference work.

4. One or more non-transitory computer-readable media as recited in claim 3, wherein the first or second category of reference work comprises a dictionary, a thesaurus, an almanac, an atlas, an encyclopedia, or a gazetteer.

5. One or more non-transitory computer-readable media as recited in claim 1, wherein the first and second reference work entries are both from a same category of reference work.

6. One or more non-transitory computer-readable media as recited in claim 5, wherein the first or second reference work entry comprises a science reference work entry, a science-fiction reference work entry, a medical reference work entry, a business reference work entry, a legal reference work entry, a native-language reference work entry, or a non-native-language reference work entry.

7. One or more non-transitory computer-readable media as recited in claim 1, wherein the force of the initial selection comprises a first force and the greater or lesser force comprises a second force, and further storing computer-executable instructions that, when executed, cause the one or more processors to perform acts comprising:
   detecting a third force on the touch-sensitive display that is greater or lesser than both the first and second forces; and
   causing display of a third, different reference work entry associated with the word on the touch-sensitive display at least partly in response to the detecting of the third force.

8. One or more non-transitory computer-readable media as recited in claim 1, wherein touch-sensitive display forms a portion of an electronic book reader device, and wherein the selected word forms a portion of an electronic book rendered by the electronic book reader device.

9. One or more non-transitory computer-readable media as recited in claim 8, wherein the first or second reference work entry is from a reference work provided by a publisher of the electronic book.

10. A method comprising:
   under control of an electronic device configured with specific executable instructions and having a touch-sensitive display,
   receiving a first user input selecting a portion of a content item being output by the touch-sensitive display, the first user input being received via the touch-sensitive display;
   causing display of a first reference work entry associated with the portion of the content item on the touch-sensitive display at least partly in response to the receiving of the first user input;
   receiving a second user input requesting to view a second reference work entry associated with the portion of the content item, the second user input comprising an additional amount of force on the touch-sensitive display;
   causing display of a second, different reference work entry associated with the portion of the content item on the touch-sensitive display at least partly in response to the receiving of the second user input; and
   measuring an amount force on the touch-sensitive display of the first user input.

11. A method as recited in claim 10, wherein:
the first user input received via the touch-sensitive display is received at a first location on the touch-sensitive display;
the touch-sensitive display is configured to detect multiple coincident touches; and
the second user input comprises a touch input received coincident with the first touch input and at a second location on the touch-sensitive display.

12. A method as recited in claim 10, wherein the electronic device further includes a keypad, and wherein the second user input is received via the keypad of the electronic device.

13. A method as recited in claim 10, wherein the electronic device further includes a microphone, and wherein the second user input is received via the microphone of the electronic device.

14. A method as recited in claim 10, wherein the electronic device further includes a camera, and wherein the second user input comprises a gesture received via the camera of the electronic device.

15. A method as recited in claim 10, wherein the first or the second reference work entry is based at least in part on a location of the electronic device when the first or second user input is received.

16. A method as recited in claim 10, wherein the causing of the display of the first or second reference work entry comprises (1) accessing the first or second reference work entry from a corresponding reference work stored on the electronic device, or (2) receiving the first or second reference work entry from a corresponding reference work over a network at least partly in response to the receiving of the first or second user input.

17. A method as recited in claim 10, wherein the content item comprises an electronic book having text, and the selected portion of the content item comprises at least one word of the electronic book.

18. A method as recited in claim 10, wherein the content item comprises a map, and the selected portion of the content item comprises a location on the map.

19. An electronic device, comprising:
one or more processors;
memory coupled to the one or more processors;
a touch-sensitive display communicatively coupled to the one or more processors to render a content item and to detect user inputs of varying force;
a content item stored in the memory; and
a reference entry selection module, stored in the memory and executable on the one or more processors to:
receive an indication that the touch-sensitive display has detected a user input having a particular force;
select one of multiple reference work entries to output on the touch-sensitive display based at least in part on the particular force of the user input;
receive an indication that the touch-sensitive display has detected another user input having a greater amount of force than the particular force; and
select a different one of the multiple reference work entries to output on the touch-sensitive display based at least in part on the greater amount of force of the another user input.

20. An electronic device as recited in claim 19, wherein the user input is received at a particular location on the touch-sensitive display associated with a particular portion of the content item, and wherein the selected reference work entry is associated with the particular portion of the content item.

21. An electronic device as recited in claim 20, wherein the content item comprises an electronic book, and the particular portion of the electronic book comprises a word within the electronic book.

22. An electronic device as recited in claim 19, wherein the selected reference work entry is from a dictionary, a thesaurus, an almanac, an atlas, an encyclopedia, or a gazetteer.

23. An electronic device as recited in claim 19, further comprising a content presentation application, stored in the memory and executable on the one or more processors to cause display of the content item and the selected reference work entry on the touch-sensitive display of the electronic device.

24. An electronic book reader device as recited in claim 19, wherein the electronic device comprises an electronic book reader device, a handheld tablet computing device, a desktop computer, a laptop computer, or a kiosk.

25. One or more non-transitory computer-readable media storing computer-executable instructions that, when executed, cause one or more processors to perform acts comprising:
detecting a selection, made by a user, of a portion of a content item being output by a touch-sensitive display;
measuring a force of the selection on the touch-sensitive display;
determining whether the measured amount of force is greater than a threshold amount of force; and
prompting the user to select a reference work entry to output on the touch-sensitive display at least partly in response to determining that the measured amount of force is greater than the threshold amount of force; and
outputting, on the touch-sensitive display, a reference work entry associated with the portion of the content item at least partly in response to determining that the measured amount of force is not greater than the threshold amount of force.

26. One or more non-transitory computer-readable media as recited in claim 25, wherein the prompting the user to select a reference work entry comprises prompting the user to select one of multiple different reference work entries.

27. One or more non-transitory computer-readable media as recited in claim 26, wherein the multiple different reference work entries each reside within a different respective category of reference work.

28. One or more non-transitory computer-readable media as recited in claim 26, wherein the multiple different reference work entries each reside within a same category of reference work.

29. One or more non-transitory computer-readable media as recited in claim 28, wherein the multiple different reference work entries within the same category of reference work comprise one or more of a science reference work entry, a science-fiction reference work entry, a medical reference work entry, a business reference work entry, a legal reference work entry, a native-language reference work entry, or a non-native-language reference work entry.

30. One or more non-transitory computer-readable media as recited in claim 25, wherein the prompting the user to select a reference work entry comprises outputting on the touch-sensitive display a selectable menu of multiple, different reference work entries.

* * * * *